United States Patent
Gray et al.

(10) Patent No.: US 7,309,977 B2
(45) Date of Patent: Dec. 18, 2007

(54) SYSTEM AND METHOD FOR AN ADAPTIVE SYNCHRONOUS SWITCH IN SWITCHING REGULATORS

(75) Inventors: Richard Landry Gray, Saratoga, CA (US); Steven Huynh, Sunnyvale, CA (US)

(73) Assignee: Active-Semi International, Inc. (KY)

( * ) Notice: Subject to any disclaimer, the term of this patent is extended or adjusted under 35 U.S.C. 154(b) by 0 days.

(21) Appl. No.: 11/519,602

(22) Filed: Sep. 11, 2006

(65) Prior Publication Data

US 2007/0080674 A1   Apr. 12, 2007

Related U.S. Application Data

(60) Provisional application No. 60/725,144, filed on Oct. 11, 2005.

(51) Int. Cl.
G05F 1/10    (2006.01)
G05F 1/652    (2006.01)

(52) U.S. Cl. ............... 323/284; 323/222; 323/286

(58) Field of Classification Search ........... 323/222, 323/282, 284, 285, 286
See application file for complete search history.

(56) References Cited

U.S. PATENT DOCUMENTS

| | | | | |
|---|---|---|---|---|
| 6,091,616 A * | 7/2000 | Jacobs et al. | ............... | 363/127 |
| 6,229,292 B1 * | 5/2001 | Redl et al. | .................. | 323/285 |
| 6,288,524 B1 * | 9/2001 | Tsujimoto | .................. | 323/285 |
| 6,288,920 B1 * | 9/2001 | Jacobs et al. | ............... | 363/127 |
| 6,396,725 B1 * | 5/2002 | Jacobs et al. | ............... | 363/131 |
| 6,459,602 B1 * | 10/2002 | Lipcsei | ..................... | 363/132 |
| 6,678,178 B2 * | 1/2004 | Lipcsei | ........................ | 363/98 |
| 6,813,173 B2 * | 11/2004 | Lipcsei | ........................ | 363/98 |
| 7,002,817 B2 * | 2/2006 | Lipcsei | ........................ | 363/98 |
| 7,031,174 B2 * | 4/2006 | Lipcsei | ........................ | 363/98 |

\* cited by examiner

*Primary Examiner*—Bao Q. Vu

(57) ABSTRACT

Techniques for an adaptive synchronous switch in switching regulators are described, one aspect of which is to achieve a more optimal on/off timing of a synchronous switch that is controlled by the comparator in a feedback control loop and thereby improves power conversion efficiency and system performance; One approach samples a node in the output of the switching regulator and generates a sampled error signal that is analyzed to determine if the current comparator offset is too high or too low relative to a target switching regulator output value at least in part based on the sampled error signal value, and accordingly generates a compensated feedback error signal and applied to the compensated feedback error signal to an input of the comparator to have the effect of a comparator offset adjustment signal.

45 Claims, 24 Drawing Sheets

PMOS is "ON"
D1 is reverse biased
Current ramps up in the inductor
Iin = IL

PMOS is "OFF"
D1 is forward biased
Current ramps down in the inductor
ID = IL

Synchronous Buck Regulator with Perfect Diode

Synchronous Boost Regulator with Perfect Diode

Inductor current and voltage for prior art synchronous boost controller drive
Prior Art mn10x
Prior Art delay1
Prior Art Magnified view of figure 20

Magnified view of figure 20

SYSTEM AND METHOD FOR AN ADAPTIVE SYNCHRONOUS SWITCH IN SWITCHING REGULATORS

CROSS-REFERENCE TO RELATED APPLICATIONS

The present Utility patent application claims priority benefit of the U.S. provisional application for patent No. US60/725,144, filed one Oct. 11, 2005 under 35 U.S.C., and entitled "Adaptive Synchronous Switch for Switching Regulators" 119(e). The contents of this related provisional application are incorporated herein by reference.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention generally relates to electronic power control devices, specifically those power control devices known as switching regulators. More particularly, the invention relates to synchronous switching regulators having an adaptive synchronous switch.

BACKGROUND OF THE INVENTION

Switching regulators have been and will continue to be extremely popular as a power control element due to their inherent high efficiency and small size. Many switching regulator topologies require a rectifying function that is most easily accomplished using a diode. The "buck" or "step down" regulator is an example of this. FIG. 1 illustrates an exemplary prior art buck regulator using a catch diode. This regulator topology can efficiently produce a lower output voltage from a higher input voltage. The circuit functions in two modes, one where the PMOS (P-type metal-oxide-semiconductor transistor) switch is closed and another where the PMOS switch is open. FIG. 2 illustrates an exemplary prior art buck regulator showing current flow when the PMOS switch is on, and FIG. 3 illustrates an exemplary prior art buck regulator showing current flow when the PMOS switch is off. When the PMOS switch is closed, current will ramp up linearly in the inductor, and when the switch is open, the current continues to flow through the inductor in the same direction. Since the current cannot flow through the open PMOS switch, it will pull current out of the diode causing the cathode to become negative with respect to the anode. The diode used in this application is known as a "catch" diode or sometimes as a "freewheeling" diode. The rectifying function provided by the diode is advantageous in many other switching power supply topologies as well, such as, but not limited to, boost converters, flyback converters and forward converters.

When the PMOS switch is closed the voltage across the inductor is (Vin−Vout), assuming an ideal PMOS device. Current ramps up in the inductor in a linear fashion controlled by the equation V=L(di/dt) where V is the voltage across the inductor, L is the inductance of the inductor in Henries and di/dt is the derivative of inductor current with respect to time. When the PMOS switch is open the voltage across the inductor is (−Vbe−Vout) where Vbe represents the forward drop of the catch diode (normally 0.4V to 0.7V). The slope of the inductor current with respect to time reverses because the polarity of the voltage across the inductor is now opposite to what it was previously. For certain operational modes, such as discontinuous operation, it is possible that the inductor current will ramp all the way down to zero. At that point the current starts to reverse its direction, which causes the catch diode to reverse bias and stop the current flow. This prevents the output capacitor from being discharged back into the ground node.

A problem with using the catch diode for buck controllers, and other switching controllers in general, is that the inherent voltage drop across the catch diode multiplied by the current through the diode wastefully dissipates a significant amount of power. This power dissipation can be unacceptable in certain applications. For buck converters with high Vin/Vout ratios the problem is more acute because the time the PMOS is on (i.e., PMOS duty cycle) becomes shorter; this means that current flows through the diode for a greater proportion of each cycle. If the current spends more of its time flowing through the diode, the current also spends more of its time dissipating power in the diode, which brings down the overall system efficiency.

In order to mitigate the diode power dissipation problem designers sometimes use schottky diodes for catch diodes in these applications. A schottky diode has an inherently lower forward voltage than a silicon diode, hence, for the same current, the power dissipation is lower. Another known solution is to replace the catch diode with an approximation of a "perfect diode". FIG. 4 shows an exemplary I-V curve of a prior art perfect diode. FIG. 5 illustrates exemplary prior art implementations of perfect diodes. A perfect diode can be implemented with a comparator and a switching element (PMOS or NMOS). Real applications do not have access to perfect comparators and switches, however using real FETs (field effect transistors) and real comparators to approximate a perfect diode does provide significant efficiency benefits beyond those of silicon or shottky catch diodes. FIG. 6 shows exemplary prior art buck and boost converters using perfect diodes. The examples shown are simplified applications using a perfect diode for both a buck configuration and a boost configuration. The technique of using active switching to provide rectification in switching power supply circuits is sometimes known as "synchronous switching".

Comparator offset voltages and finite response times do limit the usefulness of the perfect diode schemes. The drawbacks become more acute as switching frequencies increase because the time available to make an accurate comparison becomes shorter. The graphs in FIGS. 7 and 8 show that the inductor current has actually reversed slightly before the comparator can respond and turn off the synchronous switch. The non-zero inductor current left over in the inductor will cause increased ringing when both FETs are turned off. It also increases power dissipation since the left over energy in the inductor is not delivered to the load.

FIG. 7 shows idealized waveforms and circuitry of a prior art buck converter in discontinuous mode showing the effect of inductor current overshoot. The waveforms and circuitry for the buck converter are analogous to the boost converter waveforms shown in FIG. 8. Position "C" on the waveforms is a positive signal as the LX node attempts to drive above Vin but is constrained by the body diode of the PMOS device.

FIG. 8 shows idealized waveforms and circuitry of a prior art boost converter in discontinuous mode operation showing the effect of inductor current overshoot. FIG. 8 shows a simplified prior art synchronous boost topology and the idealized waveforms associated with it. At position "A" on the waveforms, the inductor current crosses through zero. This is the ideal position to turn off the rectifying PMOS transistor, but due to comparator delays and/or offsets, the PMOS does not actually turn off until position "B". Current is flowing from LX to Vin through the inductor so when the PMOS does turn off the voltage at LX falls below zero and is clamped by the body diode of the NMOS device at position "C".

FIG. 9 shows an exemplary prior art FET drive circuit with a comparator to turn off the commutating switch. In particular, FIG. 9 illustrates the drive section and power transistors for a typical prior art boost converter using idealized electronic components. A switch S1 represents the NMOS power switch and a switch S2 represents the PMOS switch used for rectification. A comparator X1 senses the polarity of the voltage across switch S2 and turns off switch S2 when the polarity indicates that current is flowing from Vout into LX. A DFF (D type flip flop) U2 ensures that once switch S2 has been turned off it cannot be turned on again until the next clock cycle. Inverters U3, U4, U5, U6, U7, and U8 mimic what would be seen in an actual transistor representation of the drive circuitry. A NOR gate U9 and a NAND gate U1 ensure that switch S1 and switch S2 are never on at the same time so that large currents do not flow directly from VOUT to VGND.

FIG. 10 shows exemplary simulation results for the prior art synchronous boost controller shown in FIG. 9 when it is used in a boost configuration. Due to finite delay times of the comparator and associated circuitry, the inductor current actually goes negative for part of each cycle. The voltage at LX is also negative when the inductor current is negative. These negative voltages and currents adversely impact the performance of the boost converter and their removal is an aspect of the present invention in accordance with an ideal diode approximation embodiment thereof.

Comparator offset voltages will cause the perfect diode to turn off before or after the current has actually dropped to zero; both cases leave unwanted energy in the inductor when both switches are off. To meet continuously more stringent performance specifications, switching regulator designers are forced to increase the speed of their perfect diode comparators, which, unfortunately, wastes more power. They are also forced to design low offset comparators, which may increase the area required for the circuitry as well as slow down the response time of the comparator, thereby negatively impacting overall regulator performance. If the designers constructs the comparator with a fixed offset that compensates for the delay of the comparator, the designer is faced with a dilemma that normal manufacturing process variations will result in unacceptable yield losses at least due to the fact that the fixed offset will only improve the performance in some of the regulators, while some other units will have too much offset and still some others will have too little.

In view of the foregoing, there is a need for a more efficient synchronous switch for switching regulators that tends to not negatively impact performance or production yield. It would also be desirable if the synchronous switch is able to minimize the overshoot current.

BRIEF DESCRIPTION OF THE DRAWINGS

The present invention is illustrated by way of example, and not by way of limitation, in the figures of the accompanying drawings and in which like reference numerals refer to similar elements and in which:

FIG. 11A is a general diagram, and FIG. 11B is a more detailed diagram;

Figure 1:
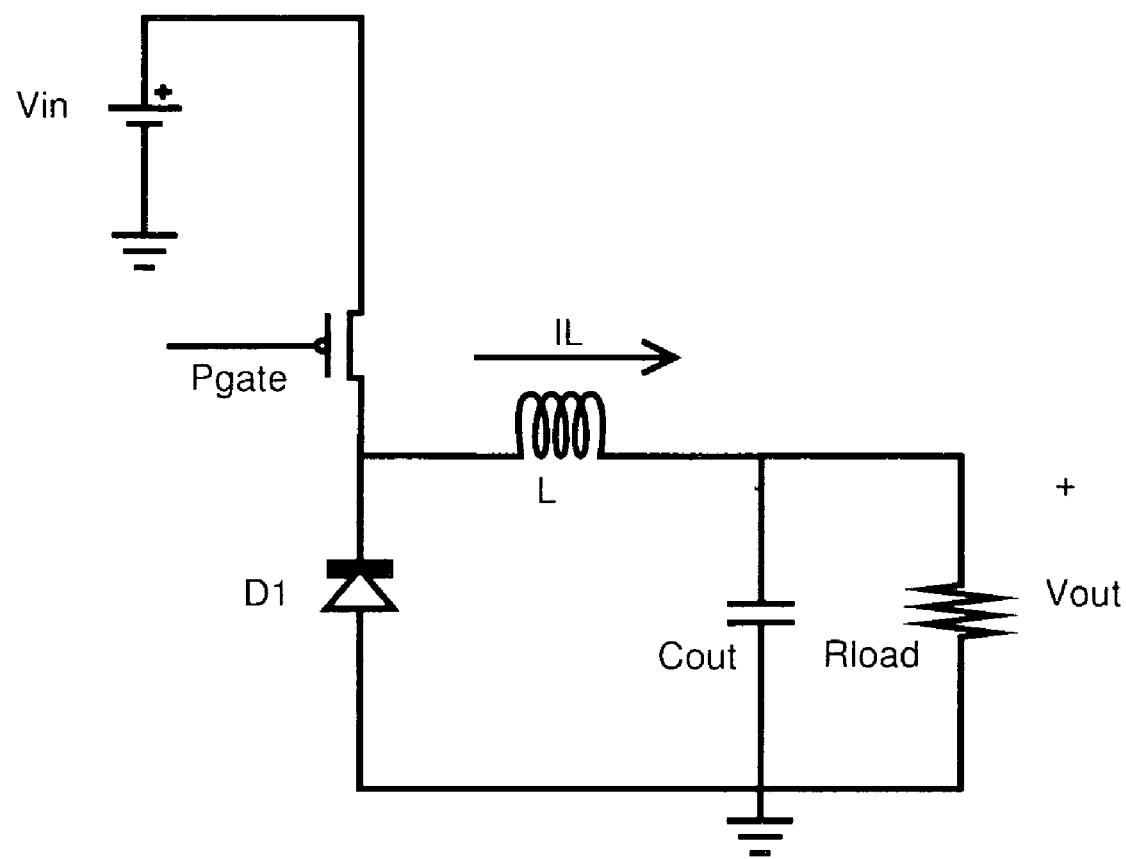
FIG. 1 illustrates an exemplary prior art buck regulator using a catch diode.
Figure 2:
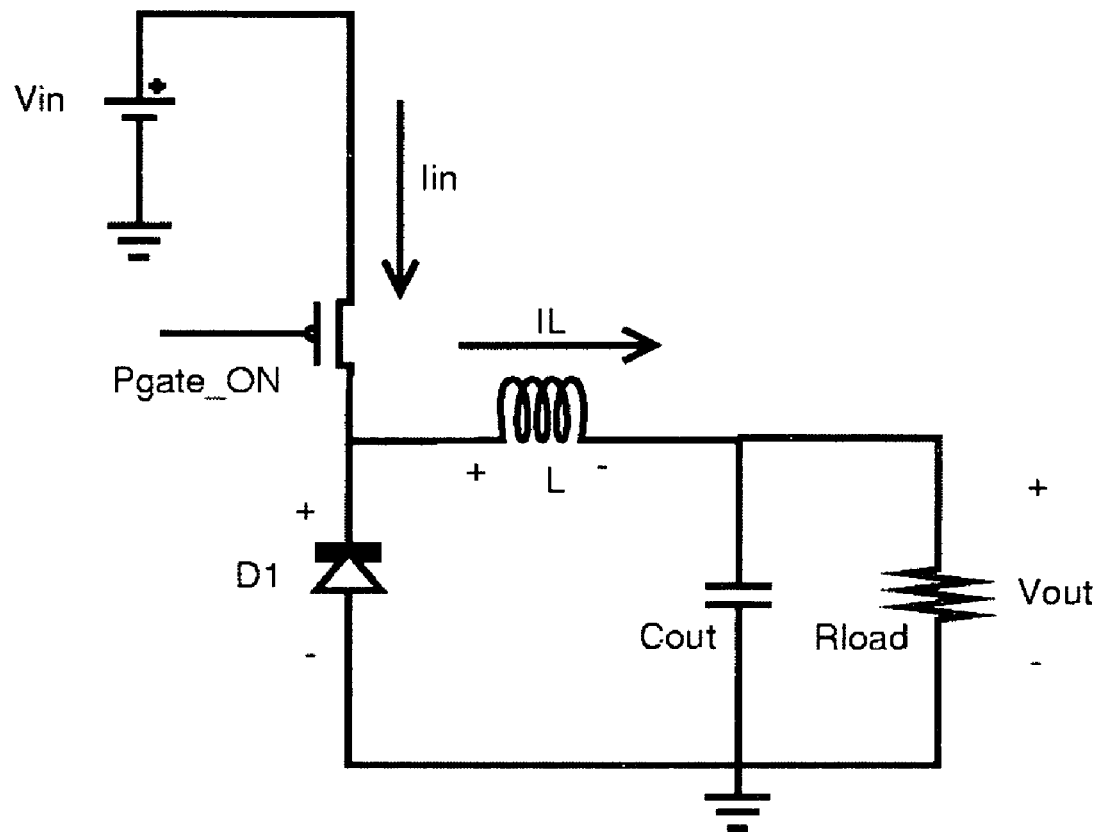
FIG. 2 illustrates an exemplary prior art buck regulator showing current flow when the PMOS switch is on, and FIG. 3 illustrates an exemplary prior art buck regulator showing current flow when the PMOS switch is off.
Figure 3:
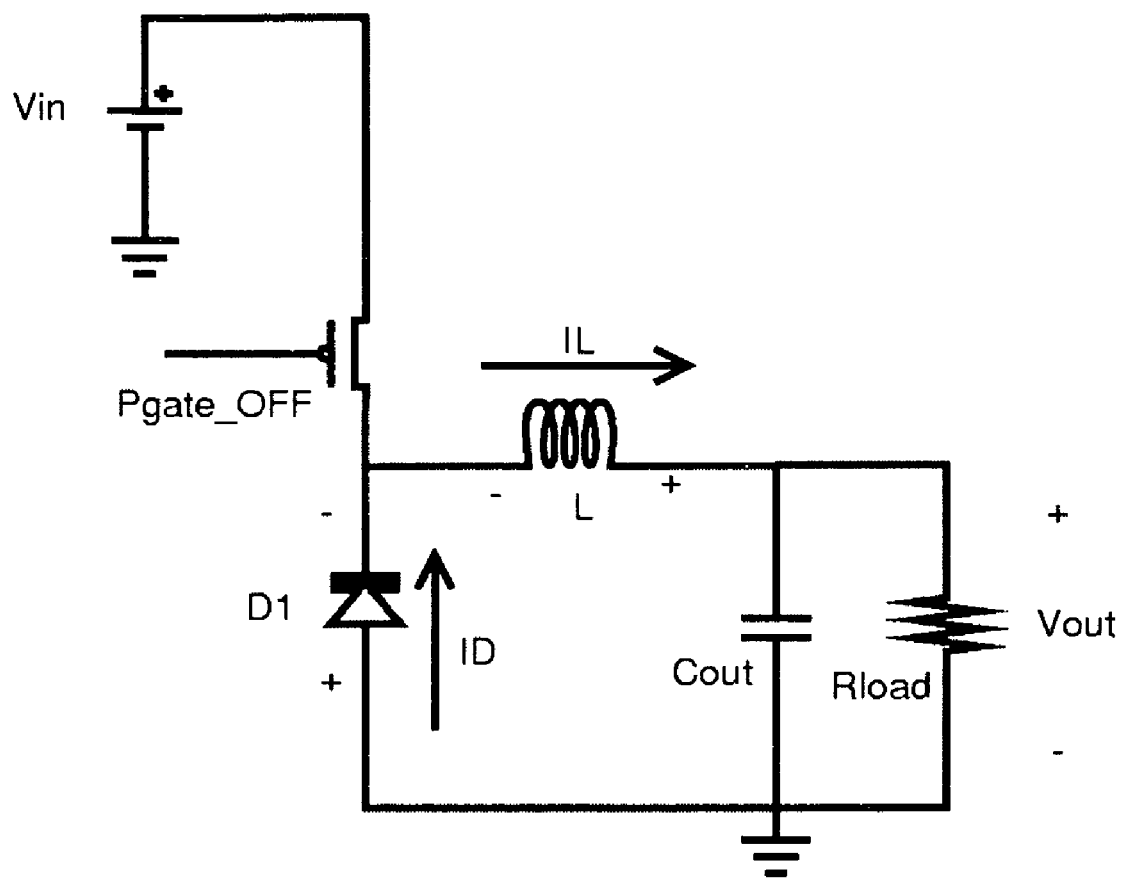
Figure 4:
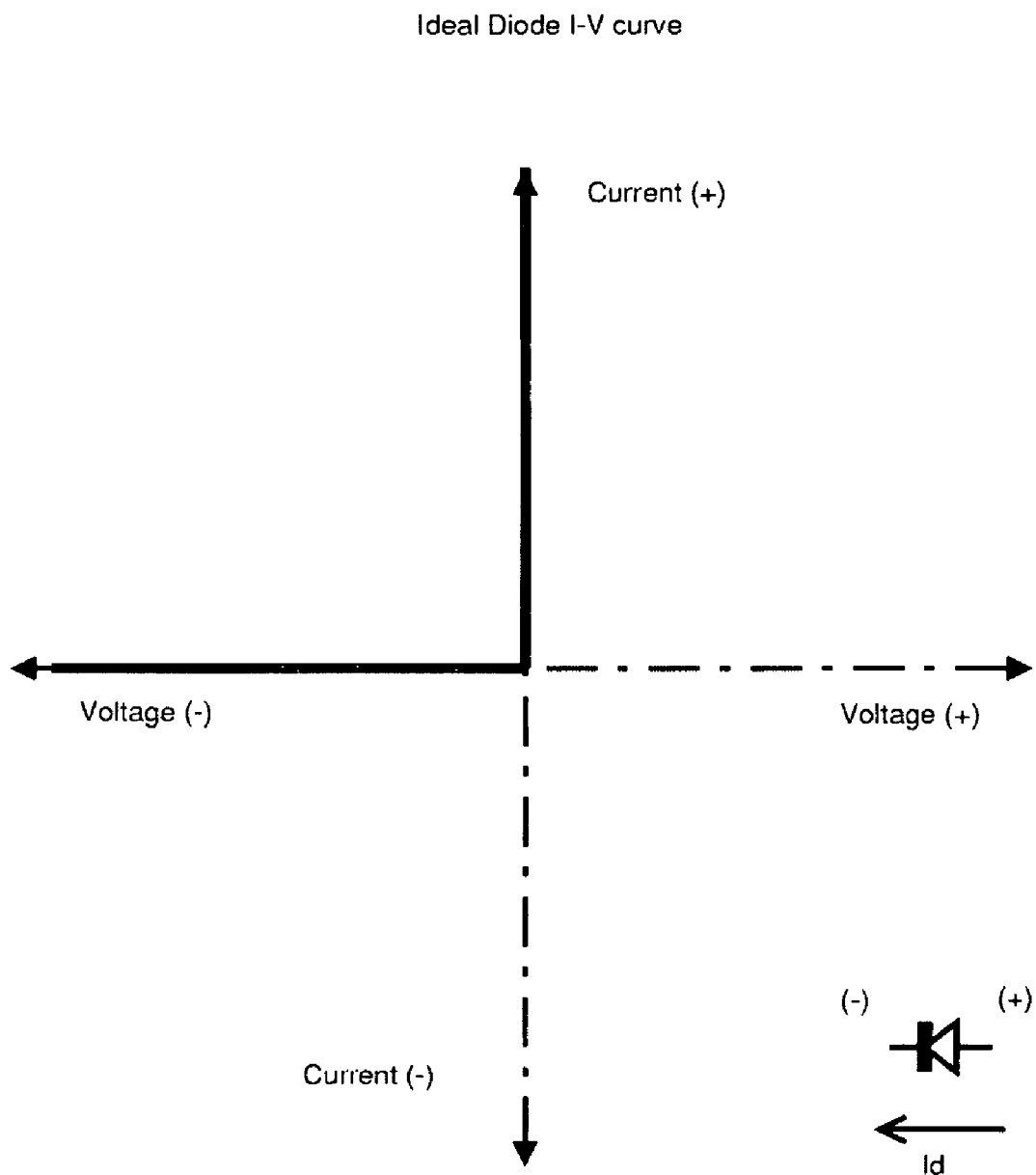
FIG. 4 shows an exemplary I-V curve of a prior art perfect diode.
Figure 5:
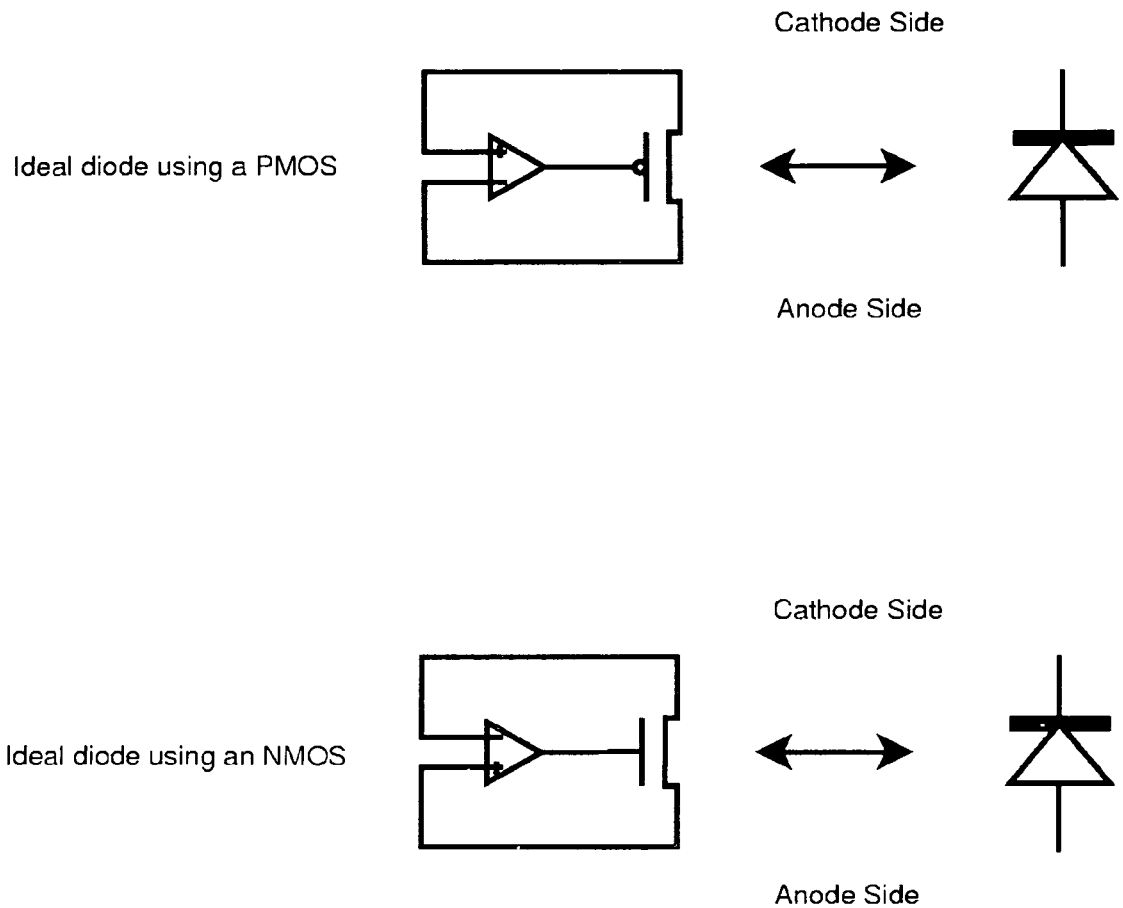
FIG. 5 illustrates exemplary prior art implementations of perfect diodes.
Figure 6:
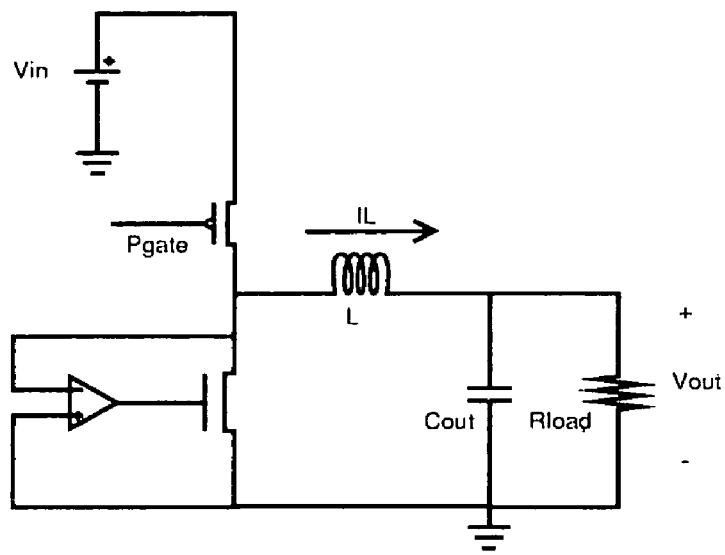
FIG. 6 shows exemplary prior art buck and boost converters using perfect diodes.
Figure 6:
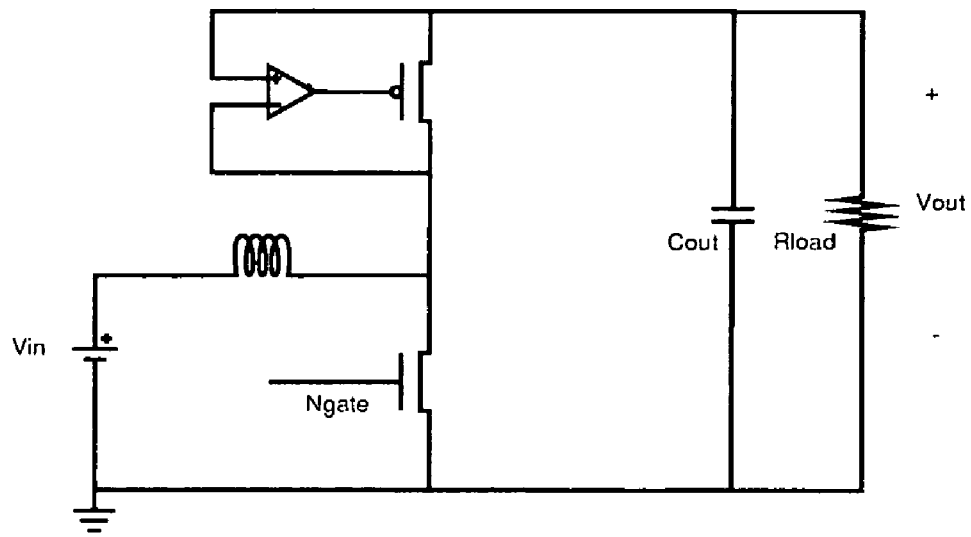

Unless otherwise indicated illustrations in the figures are not necessarily drawn to scale.

SUMMARY OF THE INVENTION

To achieve the forgoing and other objects and in accordance with the purpose of the invention, a variety of techniques for an adaptive synchronous switch in switching regulators are described.

In one embodiment of the present invention a method for adaptively compensating for the offset and delay of a comparator in a switching regulator is provided. One aspect of which is to achieve a more optimal on/off timing of a synchronous switch that is controlled by the comparator in a feedback control loop and thereby improves power conversion efficiency and system performance. In one embodiment of the present invention, the method includes the steps of sampling at least one a node in the output of the switching regulator and generating at least one sampled error signal, determining if the current comparator offset is too high or too low relative to a target switching regulator output value at least in part based on the sampled error signal value, generating a compensated feedback error signal that is based at least in part on the sampled error signal at least in part based on the offset determination, and applying the compensated feedback error signal to an input of the comparator to have the effect of a comparator offset adjustment signal, wherein the compensated feedback error signal is operable as a feedback input to the comparator to result in more optimal timing of the on and off times of the synchronous switch to improve convergence towards the target switching regulator output value and thereby lower the next sampled error signal value.

Various alternative method embodiments of the present invention may further include variations, in any combination, in which: generating the compensated feedback error signal is at least in part by way of performing an integration over a plurality of the at least one sampled error signals; generating the compensated feedback error signal is at least in part by way of performing an integration and/or differential and/or gain operation over the at least one sampled error signals; generating the compensated feedback error signal is at least in part based on the degree the sampled error signal deviates from the target output value; generating the compensated feedback error signal is at least in part based on using a lookup table to retrieve a correction value that corresponds to a characteristic of the sampled error signal; the control loop is a negative feedback control loop, and the step of generating the compensated feedback error signal includes the step of generating a signal that has a counteracting effect to the at least one sampled error signal; the step of sampling the at least one node occurs at some time delay after the synchronous switch turns off; at least one of the sampled nodes is the output node of a half-bridge driver in the output of the switching regulator with a binary state and the sample node signal value is a voltage, and the method further includes the steps of if the sampled node voltage is higher than some predetermined threshold value, then forcing the sate of the sampled binary state node to a "1" state for the remainder of the cycle, and if the sampled node voltage is lower than some predetermined threshold value, then forcing the state of the sampled binary state node to a "0" state for the remainder of the cycle and the step of generating the compensated feedback error signal is at least in part based upon integrating the 1 and 0 states over a certain time period; and/or the step of generating the compensated feedback error signal is further at least in part based upon using the integrated signal to adjust the offset of the comparator such that the time-averaged value of the sampled node voltage is driven toward the predetermined threshold thereby achieving bipolar correction towards the target output value.

Yet other alternative method embodiments of the present invention may further include, in any combination, the step of: using a D type flip flop (DFF) to sample the node voltage and determines a 1 or 0 node state, whereby the predetermined threshold value is the input logic threshold of the DFF, and/or configuring a comparator as part of a commutating circuit designed to simulate an ideal diode that optionally acts as the synchronous switch.

Means for implementing any of the foregoing functions are also provided.

A system is also provided for adaptively compensating for the offset and delay of a comparator in a switching regulator to thereby achieve a more optimal on/off timing of a synchronous switch that is controlled by the comparator in a feedback control loop. In one embodiment thereof, the system includes a sampling feedback unit that samples at least one a node in the output of the switching regulator and generates at least one sampled error signal, a feedback analysis unit that determines if the current comparator offset is too high or too low relative to a target switching regulator output value, the feedback analysis unit receiving the sampled error signal value as an input and, based at least in part thereupon, outputs an offset determination signal, and a feedback compensation unit, which receives the sampled error signal and the offset determination signal as inputs, and, based at least in part thereupon, and generates as an output a compensated feedback error signal, the compensated feedback error signal being communicated as a feedback input to the comparator such that the compensated feedback error signal is operable as a comparator offset adjustment signal that results in more optimal comparator control output timing of the on and off times of the synchronous switch and thereby improve convergence towards the target switching regulator output value and lower the next sampled error signal value.

Various alternative system embodiments of the present invention may further include variations, in any combination, in which: the feedback compensation unit generates the compensated feedback error signal at least in part by integrating a plurality of the at least one sampled error signals; the feedback compensation unit generates the compensated feedback error signal at least in part by performing an integration and/or differential and/or gain operation on one or more of the at least one sampled error signals; the feedback compensation unit generates the compensated feedback error signal at least in part based on the degree the sampled error signal deviates from the target output value; the feedback compensation unit generates the compensated feedback error signal at least in part by using a lookup table to retrieve a correction value that corresponds to a characteristic of the sampled error signal; the control loop is a negative feedback control loop, and the feedback compensation unit generates the compensated feedback error signal such that it has a counteracting effect to the at least one sampled error signal; the sampling feedback unit samples the at least one node at some time delay after the synchronous switch turns off; and/or the comparator offset adjustment signal is operable to adjust the offset of the comparator in one or two directions;

Yet another alternative system embodiment to the foregoing may further include an ideal diode emulation unit that compresses a comparator configured as part of a commutating circuit designed to emulate an ideal diode, the ideal diode emulation unit being optionally configured to be the synchronous switch. This embodiment may further include alternative embodiment variations, in any combination, in which: at least one of the sampled nodes is the output node of a half-bridge driver in the output of the switching regulator; the sampled node has a binary state and the sample node signal value is a voltage, and in which the feedback analysis unit forces the state of the sampled binary state node to a "1" state for the remainder of the cycle if the sampled node voltage is higher than some predetermined threshold value, or forces the state of the sampled binary state node to a "0" state for the remainder of the cycle if the sampled node voltage is lower than some predetermined threshold value; the feedback compensation unit generates the compensated feedback error signal is at least in part based upon integrating the 1 and 0 states over a certain time period; the feedback compensation unit generates the compensated feedback error signal additionally at least in part based upon using the integrated signal to adjust the offset of the comparator such that the time-averaged value of the sampled node voltage is driven toward the predetermined threshold thereby achieving bipolar correction towards the target output value; the feedback compensation unit generates the compensated feedback error signal is at least in part based upon using the integrated signal to adjust the offset of the comparator such that the time-averaged value of the sampled node value is driven toward the predetermined threshold; the feedback compensation unit is a D type flip flop (DFF) configured to sample the node voltage and determines the 1 or 0 node state, whereby the predetermined threshold value is the input logic threshold of the DFF and the compensated feedback error signal is the logically negated (QBAR) output of the DFF; and/or the compensated feedback error signal output is conditioned by configuring it to drive a current fed integrator such that one state of QBAR results in a net flow of charge on or off a capacitor and the other state of QBAR causes an opposite net flow of charge on or off of the capacitor and optionally the voltage on the capacitor may be used as a signal conditioned version of the compensated feedback error signal output, which is communicated to the feedback input of the comparator so as to be operable as the offset adjustment signal used to adjust the comparator offset voltage. It should be noted that a "1" or "0" states were chosen arbitrarily chosen to indicate that the sensed node is higher than a certain threshold (i.e., "high") or lower than a certain threshold (i.e., "low"), respectively. This intent of such symbolic representation is to simply indicate the relative polarity that the other blocks in the error signal path use to provide a negative feedback signal; i.e., one that produces the desired correction of the comparator offset voltage.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

The present invention will now be described in detail with reference to embodiments thereof as illustrated in the accompanying drawings.

It is to be understood that any components or exact values indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Figure 11A:
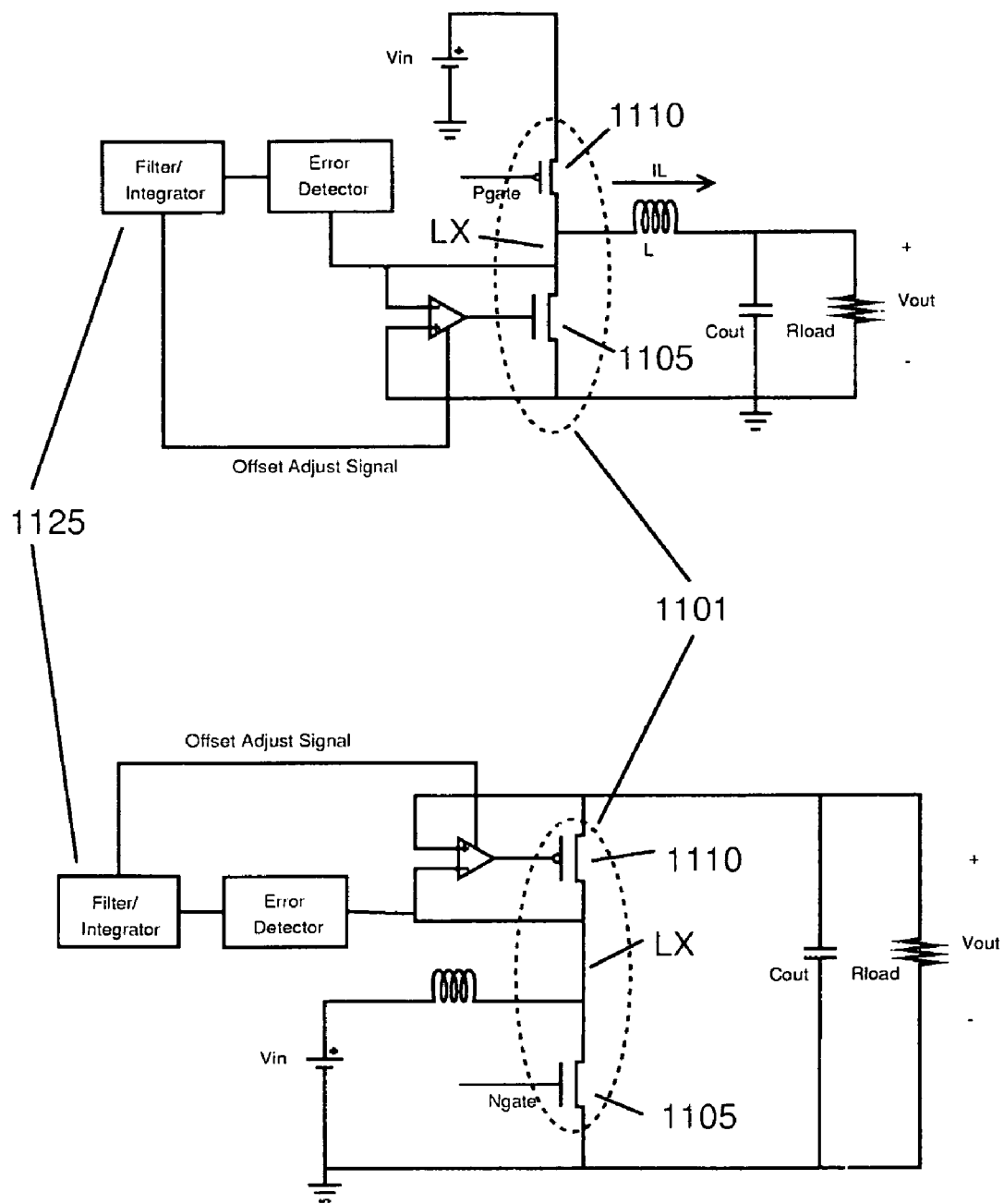
FIGS. 11A and 11B are exemplary buck and boost block diagrams illustrating an exemplary synchronous switch, in accordance with an embodiment of the invention.
Figure 11B:
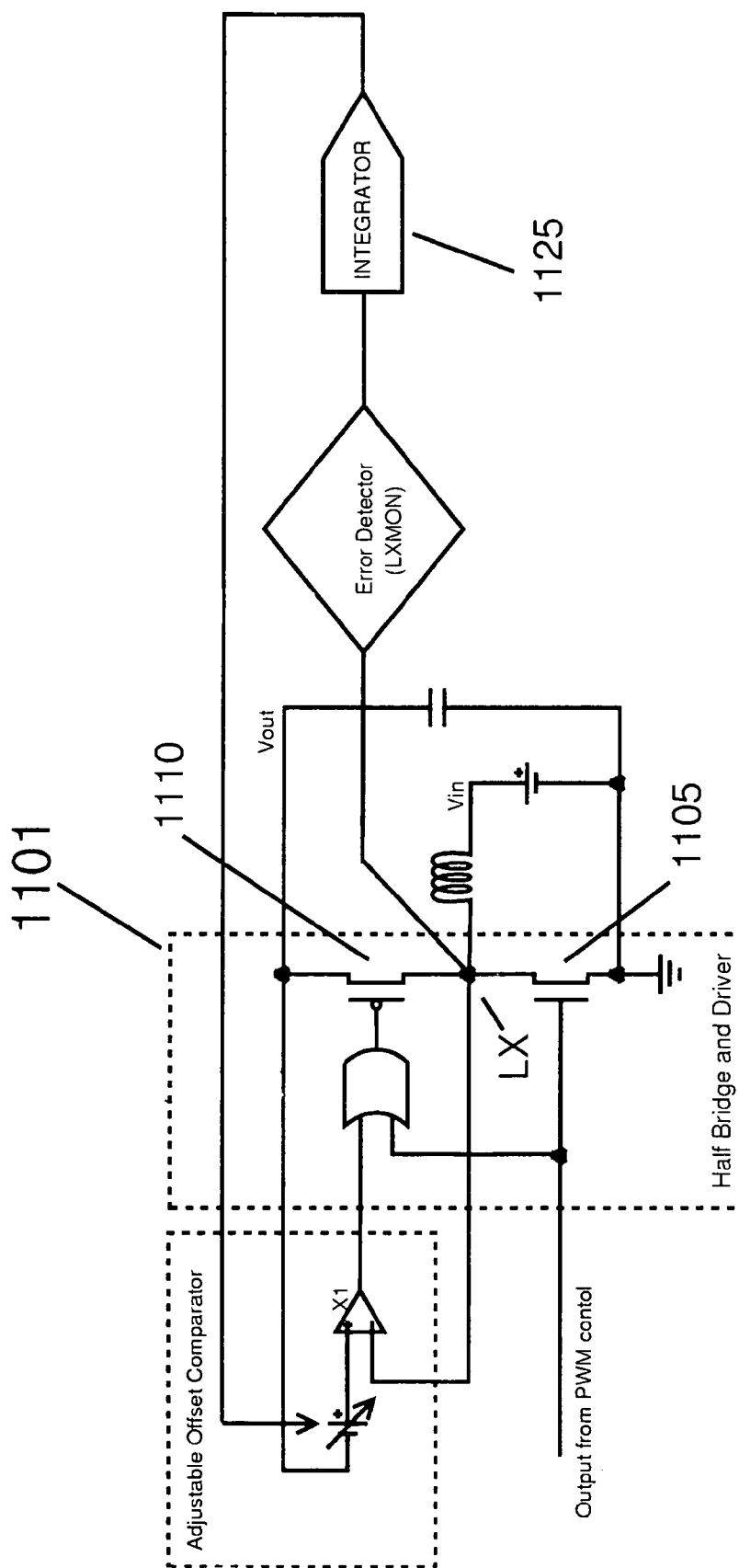

An aspect of the present invention is to adapt the offset of the perfect diode comparator so that the diode comparator substantially compensates for its own delay and inherent offset in order to shut down at a sufficiently precise time that is more optimal for circuit operation. In contemplated embodiments, circuitry is added that detects the overshoot or undershoot of the voltage at the drive node of the inductor and creates an error signal proportional to the overshoot or undershoot. This error signal is filtered and fed back into offset adjustment circuitry of the perfect diode comparator so that the original error signal is minimized, as shown in FIGS. 11A and 11B. This technique inherently adjusts for process variations at least by measuring the results of poor rectification and compensating for the variation rather than predicting the poor rectification and compensating for the predicted amount. It should be noted that the voltage waveform at the driving node of the inductor may be discriminated in other ways besides just a certain amount of overshoot or undershoot. For example, in a more general case, a function comprised of time, voltage, and or frequency composition of the waveform could be used to derive an appropriate error signal. Non-linear discriminating functions can be used to decrease the time required for the feedback loop to stabilize. It is also instructive to note that the technique is not specific to boost and buck switching converters but can be applied to any circuit which is actively commutated. This includes, but is not limited to, flyback converters, forward converters and motor control circuits.

Figure 7:
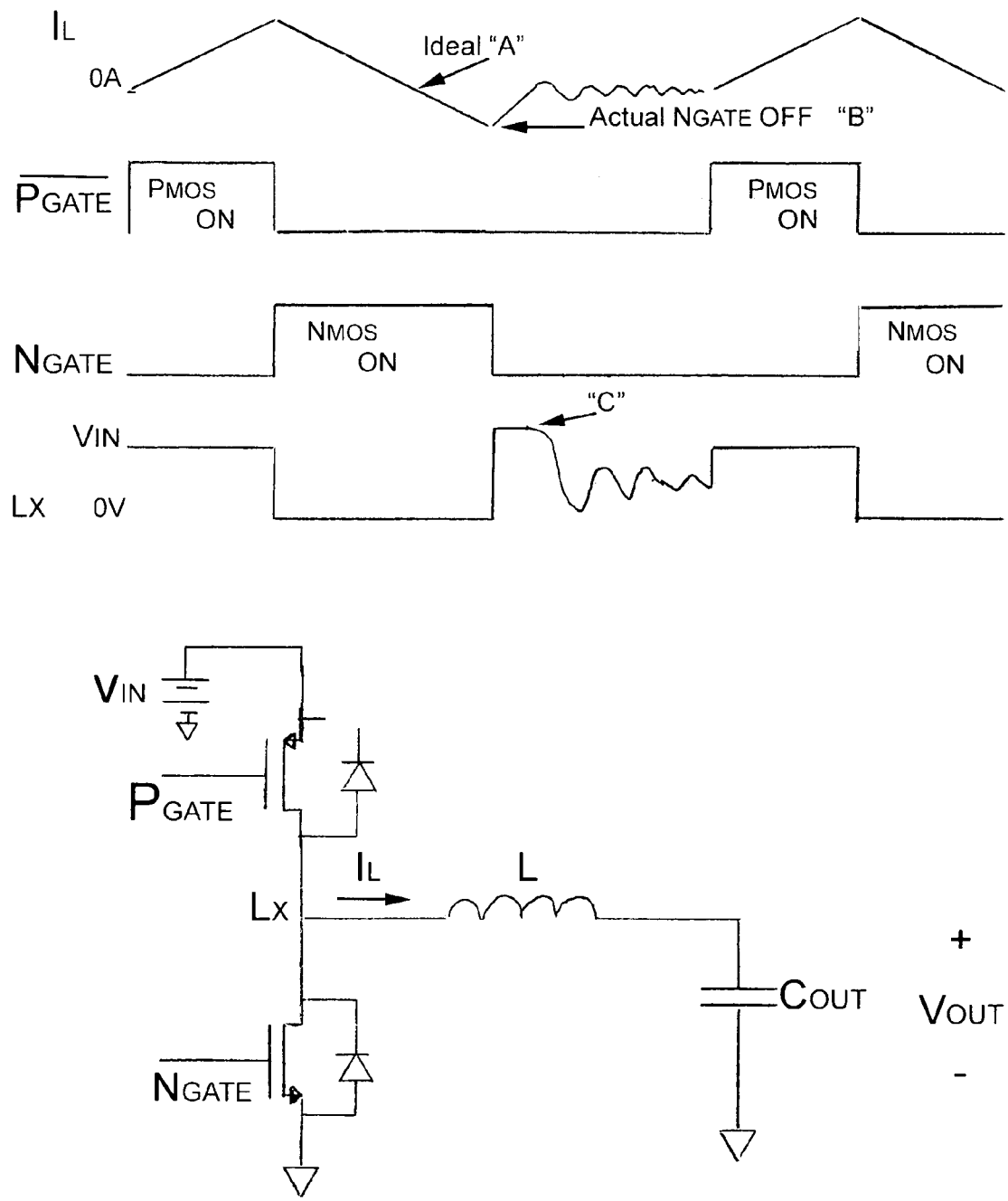
FIG. 7 shows idealized waveforms and circuitry of a prior art buck converter in discontinuous mode showing the effect of inductor current overshoot.
Figure 8:
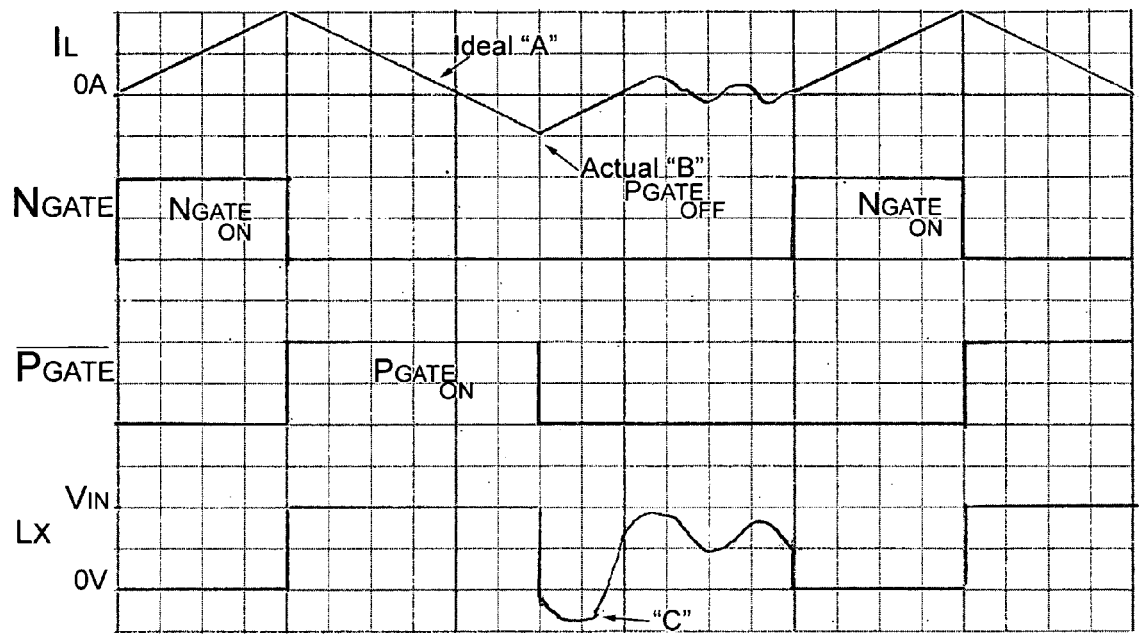
FIG. 8 shows idealized waveforms and circuitry of a prior art boost converter in discontinuous mode operation showing the effect of inductor current overshoot.
Figure 8:
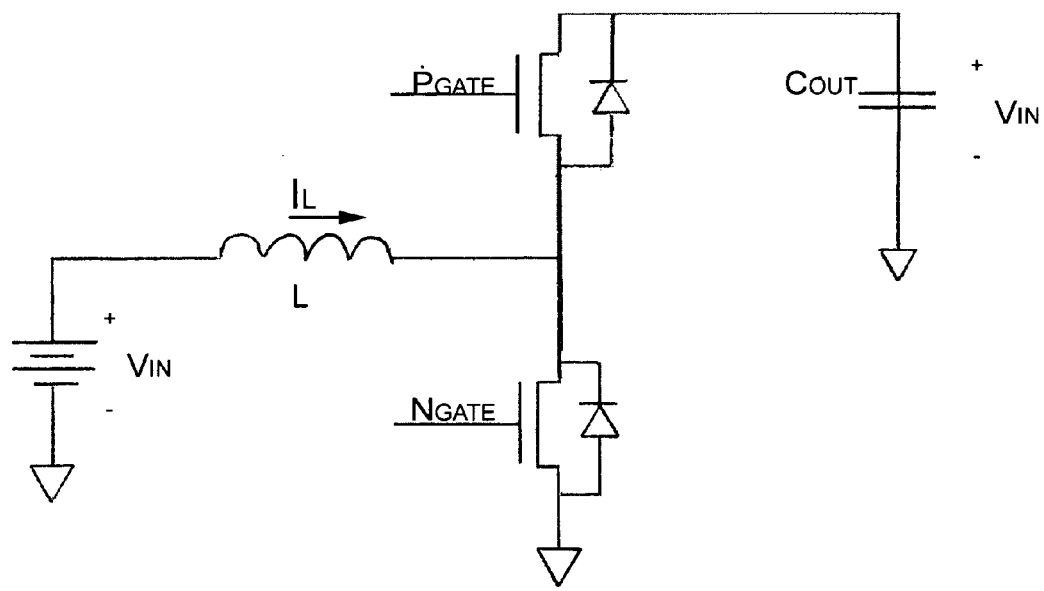
Figure 9:
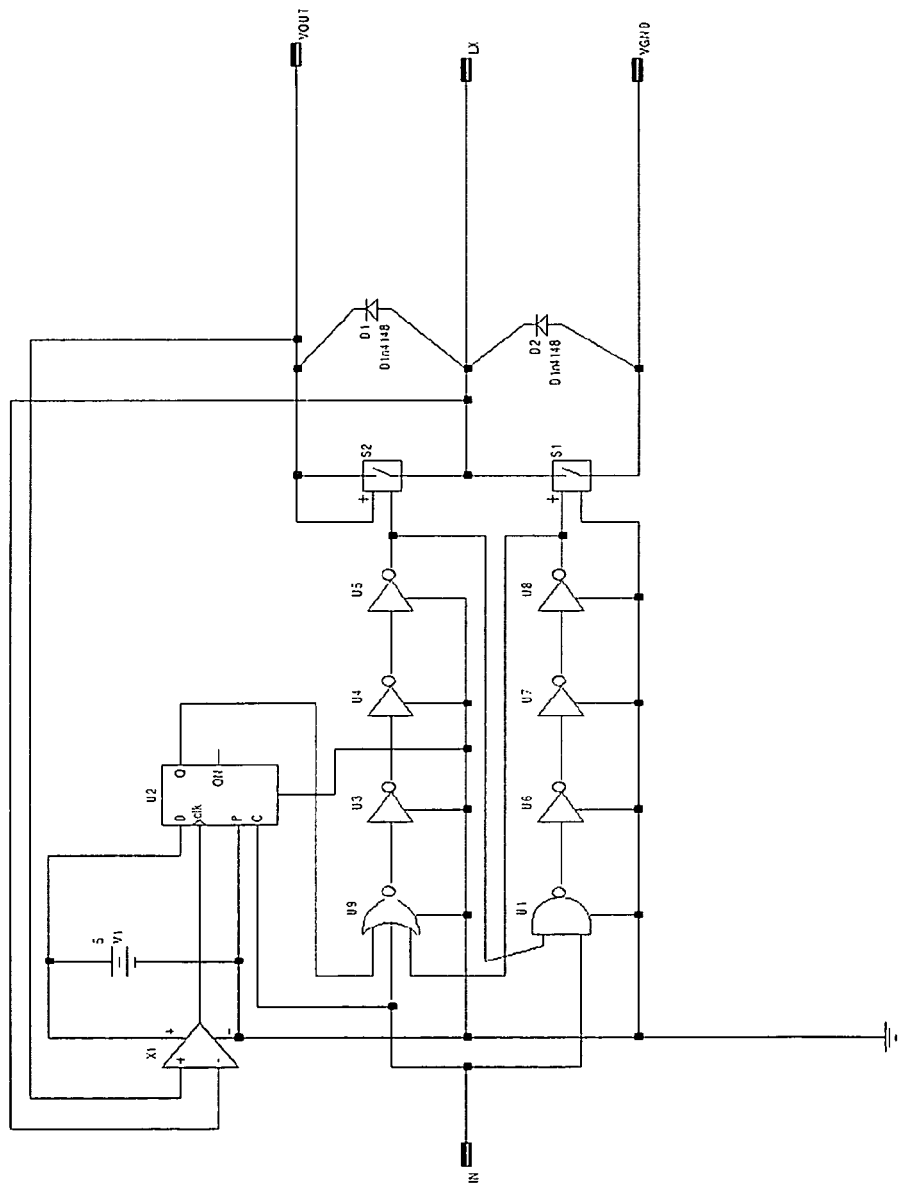
FIG. 9 shows an exemplary prior art FET drive circuit with a comparator to turn off the commutating switch.

FIGS. 11A and 11B are buck and boost block diagrams illustrating an exemplary synchronous switch, in accordance with an embodiment of the invention. FIG. 11A is a general diagram, and FIG. 11B is a more detailed diagram. In the center of the regulator circuits shown there is a half bridge driver 1101 that drives an LC network. During continuous mode operation an NMOS 1105 and a PMOS 1110 are alternately on or off with only a small interval when both switches are off in order to prevent simultaneous conduction of both switches (and therefore increased power loss). During discontinuous operation both NMOS 1105 and PMOS 1110 may be off simultaneously. As described above and specifically for boost implementations as shown in FIG. 11B, PMOS 1110 can be turned off when the current starts to reverse in the inductor as sensed by the voltage drop [VOUT−V(LX)−V(offset)] across an error detector functional block shown conceptually as "LXMON", which may be implemented as a PMOS switch (not shown) or any other suitable error detection means known to those skilled in the art. A comparator X1 senses the [VOUT−V(LX)−V(offset)] voltage difference (i.e., the error voltage) and drives POFF high when an inductor node LX drops sufficiently below the VOUT voltage. As described in some detail below, comparator X1 has an adjustable offset in order to compensate for its own delay and inherent offsets. In the context of FIGS. 7 and 8, if an embodiment of the present invention were suitably implemented thereto, the circuitry would detect the overshoot at position "C" and attempt to minimize the overshoot by adjusting the offset of comparator X1.

As shown in FIG. 11B, an inductor node LX is examined by a circuit LXMON (Error detector) after PMOS 1110 of half bridge 1101 is turned off. The behavior of inductor node LX at times after PMOS 1110 is turned off is generally indicative of the residual current left in the inductor. For the boost topology case, if PMOS switch 1110 is turned off earlier than the actual inductor zero current point, LX node will move positive just after PMOS 1110 is disengaged. If PMOS switch 1110 is turned off later than an inductor zero current point, the inductor current will change polarity and would tend to pull the LX voltage negative. For the case where the present embodiment is in buck mode, the state of the LX node after PMOS switch 1110 turns off in discontinuous mode is the opposite of the state the present embodiment would be in if it were in boost mode. Circuit LXMON sends an error signal to an integrator 1125 that depends on the observations made by circuit LXMON of the LX node.

In a more basic form, circuit LXMON may only discriminate between LX high and LX low after PMOS switch 1110 is disengaged. However, finer observations of LX are also possible, for instance, without limitation, circuit LXMON may be able to base the output error signal on the amount of time that inductor node LX stayed high or low after PMOS switch 1110 was turned off. In some implementations, the circuit may also further discriminate the LX situation by producing an error signal that was proportional to a voltage different between inductor node LX and some desired LX voltage at a particular time after PMOS switch 1110 closes. Those skilled in the art will recognize a multiplicity of alternative and suitable implementations of circuit LXMON in light of the teachings of the present invention. For example, the circuitry of circuit LXMON can be implemented in more than one way depending on what conditions are to be detected at LX node. A first exemplary implementation, described in some detail below, is shown by way of example in FIG. 12.

Figure 12:
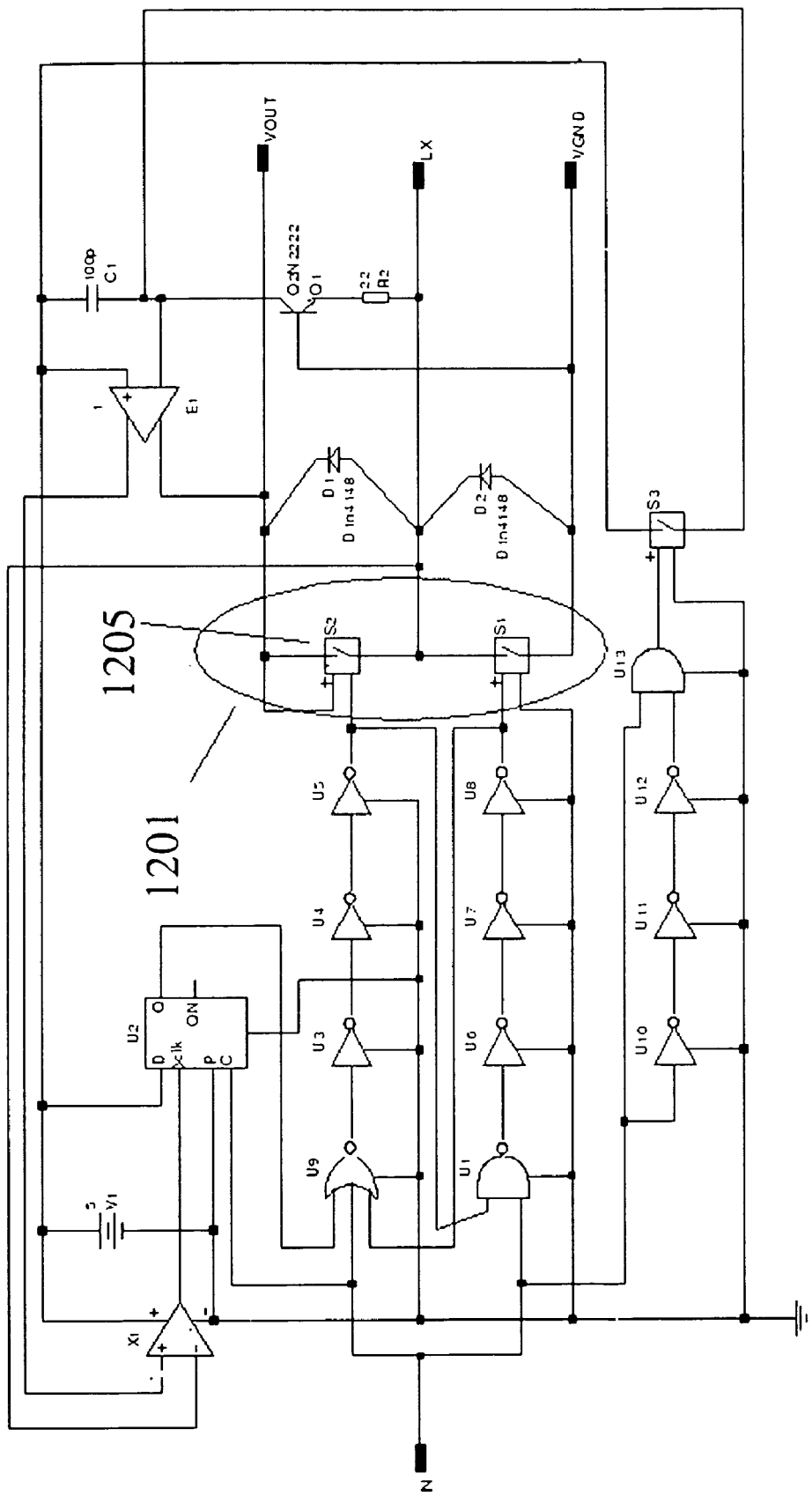
FIG. 12 is a high level schematic representation of an exemplary synchronous switch showing drive circuitry and adaptive offset control of the synchronous switch, in accordance with an embodiment of the present invention.

FIG. 12 is a high level schematic representation of an exemplary synchronous switch showing drive circuitry and adaptive offset control of the synchronous switch, in accordance with an embodiment of the present invention. The implementation shown in the Figure looks for LX transitions below ground or some other conveniently low voltage. The present embodiment is single sided in that it creates an error signal only when a half bridge PMOS 1201 turns off later than the optimal turn off time. Typically the optimal turn off time is the point when the inductor current is zero. The present embodiment generates no error signal when a PMOS 1205 turns off earlier than the ideal point. In other words the present embodiment only pushes the offset of the zero crossing comparator in one direction, other circuitry must push the zero crossing comparator offset in the other direction. This is generally not a problem for most practical cases since PMOS 1205 generally turns off later than the ideal inductor zero current point due to its typically unavoidable delay. This is a multiplicity of known techniques to remedy this problem. In the present case a single resistor, for example, without limitation, can be implemented to push the comparator offset in a direction in opposition to that provided by the circuitry of circuit LXMON, or as seen in FIG. 12, a pulsed switch made of an inverter U10, an inverter U11, an inverter U12, an AND gate U13 and a switch S3 can accomplish the same function.

Figure 10:
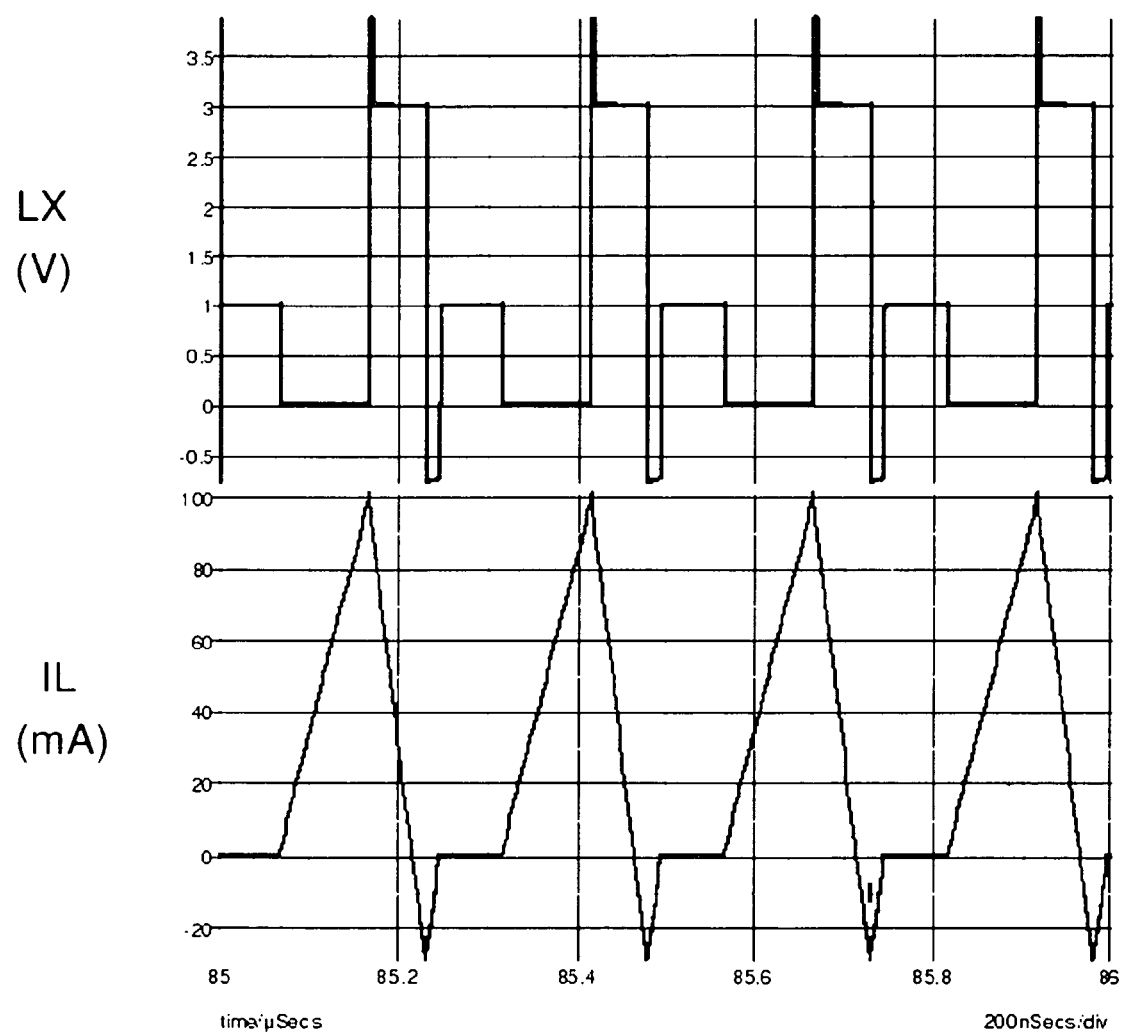
FIG. 10 shows exemplary simulation results for the prior art synchronous drive circuitry shown in FIG. 9 when it is used in a boost configuration.

The single sided LXMON implementation mentioned before is illustrated by way of example in the schematic of FIG. 12. The schematic shown in FIG. 12 comprises a similar drive circuit as that shown in FIG. 10 with the addition of circuitry that will adaptively change the offset of a comparator X1 so that switch S2 will turn off much closer to the actual inductor current zero crossing. A bipolar transistor Q1 will conduct current when LX drives below VGND. Every time transistor Q1 conducts, a small charge is pulled off of a capacitor C1 causing the voltage at that node to decrease. A converter E1 is a voltage-to-voltage converter whose output is in series with the positive input of perfect diode comparator X1. Any voltage across capacitor C1 increases the composite offset voltage of comparator X1 and converter E1 so that comparator X1 tends to turn off a switch S1 at an earlier time for example, without limitation, when the inductor current is more positive.

Inverters U10, U11, U12, and AND gate U13 produce a narrow pulse at the controlling node of switch S3 on every positive edge of a node IN. This injects some charge onto capacitor C1 that, in opposition to the current through transistor Q1, tends to increase the voltage of capacitor C1. Current though transistor Q1 changes the comparator offset so that the rectifying switch turns off earlier in the cycle. The injected charge from AND gate U13 does the opposite. The amount of injected charge is directly proportional to frequency; this allows proper control of the comparator offset voltage when pulses are skipped during light load operation. When the load current is above the threshold that produces pulse skipping, the switching frequency is constant and the injected current from AND gate U13 is also constant.

Figure 13:
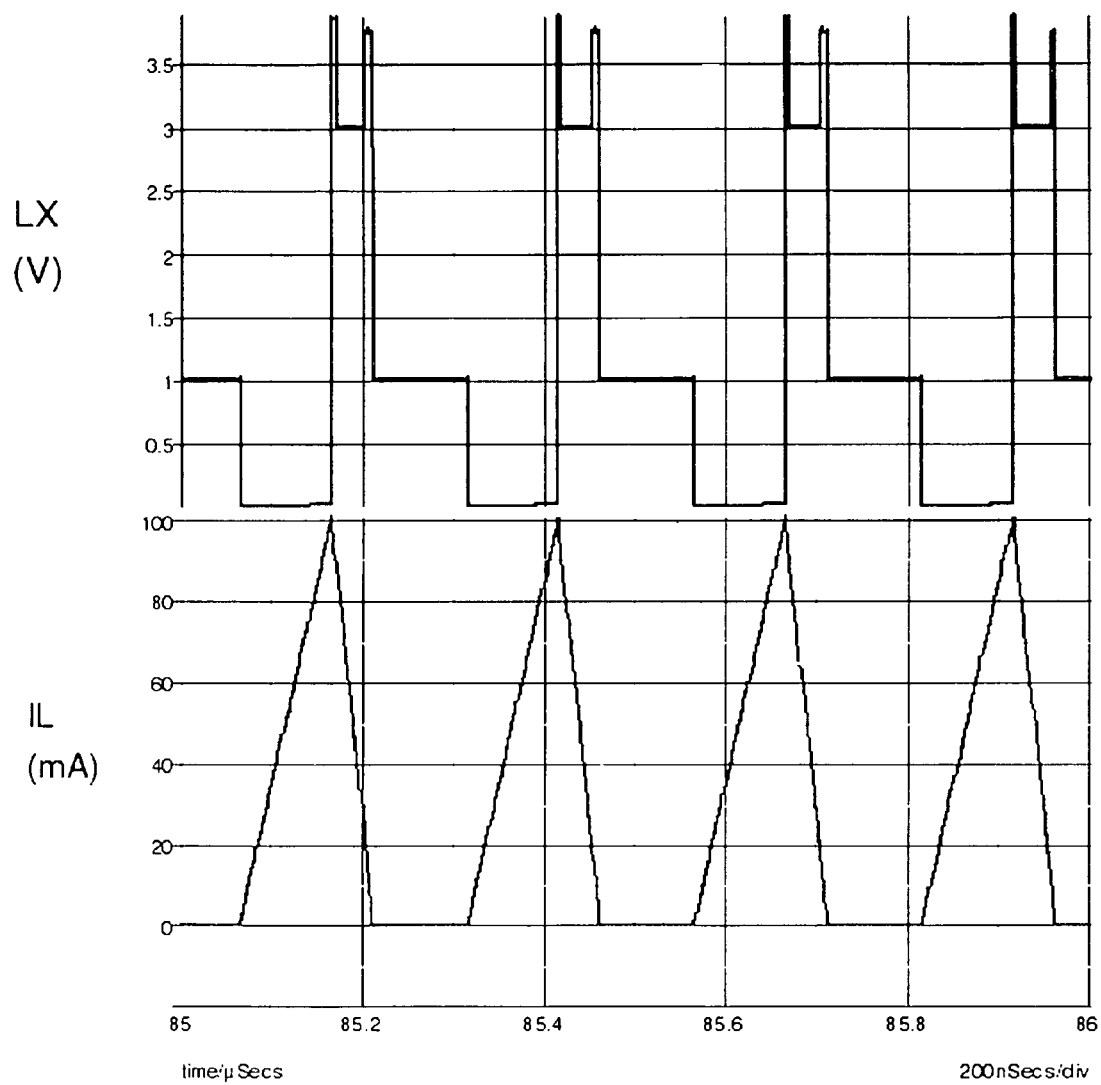
FIG. 13 shows exemplary simulation results of the embodiment of the present invention shown in FIG. 12 when used in a boost converter topology, showing that the inductor overshoot current has been reduced to very small levels, in accordance with an embodiment of the present invention.

FIG. 13 shows exemplary simulation results of the embodiment of the present invention shown in FIG. 12 when used in a boost converter topology, showing that the inductor overshoot current has been reduced to very small levels, in accordance with an embodiment of the present invention. These results were obtained using ideal circuit elements, and as such the results are not entirely physically accurate. Never-the-less, the results do exemplify the benefits of the present embodiment of the invention. As shown, the inductor current overshoot has been reduced to undetectable levels, and the LX voltage returns to Vin very shortly after the synchronous switch is disengaged. Also, the actual voltage V(LX) only remains there for a very short time because the residual energy left in the inductor after a switch S2 turns off is very small.

Figure 14A:
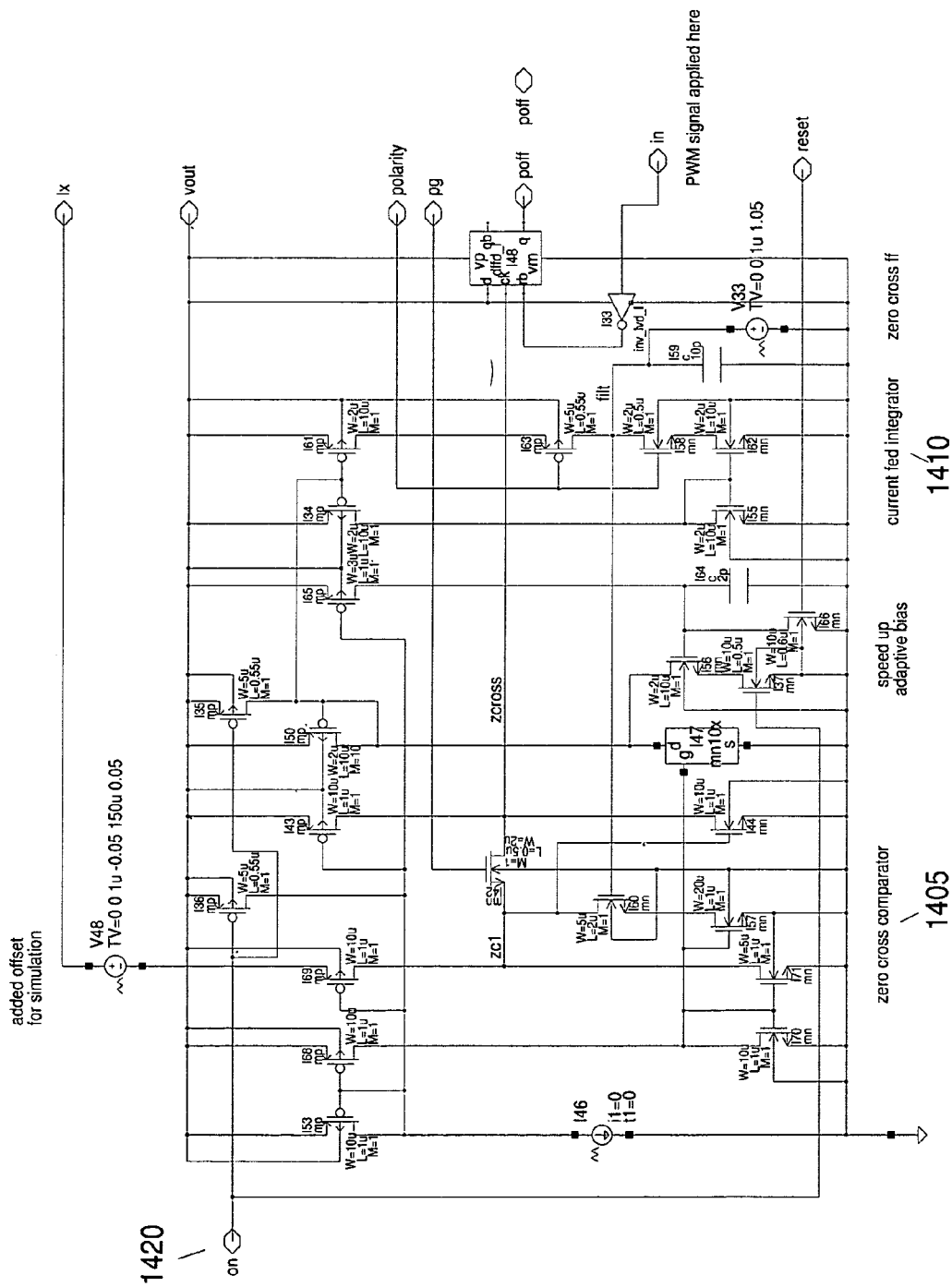
FIGS. 14a and b illustrate an exemplary transistor schematic representation of a synchronous switch, in accordance with the preferred embodiment of the present invention.
Figure 14B:
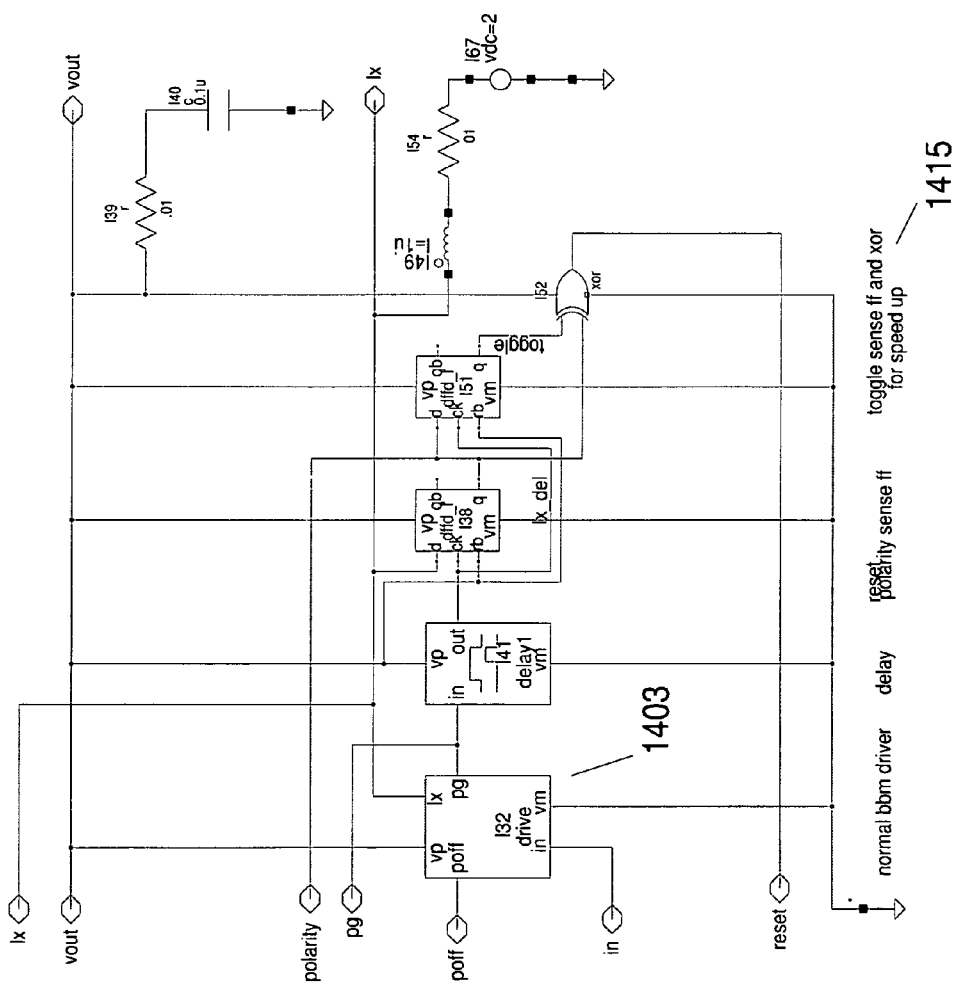

The second implementation of the LXMON circuitry is next described and shown by way of example in FIGS. 14a and 14b. FIGS. 14a and 14b illustrate a transistor schematic representation of an exemplary synchronous switch, in accordance with the preferred embodiment of the present invention. The implementation shown samples the LX voltage at a certain fixed (preferably very small) delay after a half bridge PMOS within drive block 1403 disengages. A detailed view of drive block 1403 is shown by way of example in prior-art FIG. 15 where the half bridge PMOS is labeled 1501 therein. If the voltage of LX is high at this time, the circuitry of circuit LXMON provides a signal that tends to change the offset of a zero cross comparator such that it will turn off later in time, thereby moving the comparator transition to a point nearer the actual inductor zero current crossing. If the voltage of LX is low at this time, the circuitry of circuit LXMON provides a signal that tends to change the offset of the zero cross comparator so that it makes its transition earlier in time, again moving the actual comparator transition towards the ideal zero crossing situation.

Irrespective of the particular implementation of the LXMON circuitry, in preferred embodiments of the present invention, circuit LXMON provides an error signal to an integrator which integrates all of the individual error contributions from circuit LXMON into a smoothly varying zero cross comparator offset adjustment signal, and thereby generating a compensated feedback error signal according to an embodiment of the present invention. The time constant of the integrator will determine how quickly the present embodiment can correct for system offsets and delays. However, it is contemplated that those skilled in the art, depending upon the needs of the particular application, may implement alternative and suitable techniques of acquiring, tracking, and responding to the error signal in accordance with know approaches in the art. For example, without limitation, instead of being a simple difference signal that is averaged by an integrator, some implementations may detect a rate of change in the absolute value of the LXMON node to predict a target state, and/or respond with a non-linear comparator offset signal that may be based on a lookup table, for example. By way of further example, and not limitation, instead of just performing an integration operation, in alternative embodiments (not shown) the compensated feedback error signal is generated by way of conventional proportional, integral, derivative feedback controller techniques and/or variations based thereupon. Yet other embodiments (not shown), may sample one or more nodes in the regulator's output and generate the compensated feedback error signal based at least in part on analytical equations and/or conventional DSP filtering techniques.

Figure 15:
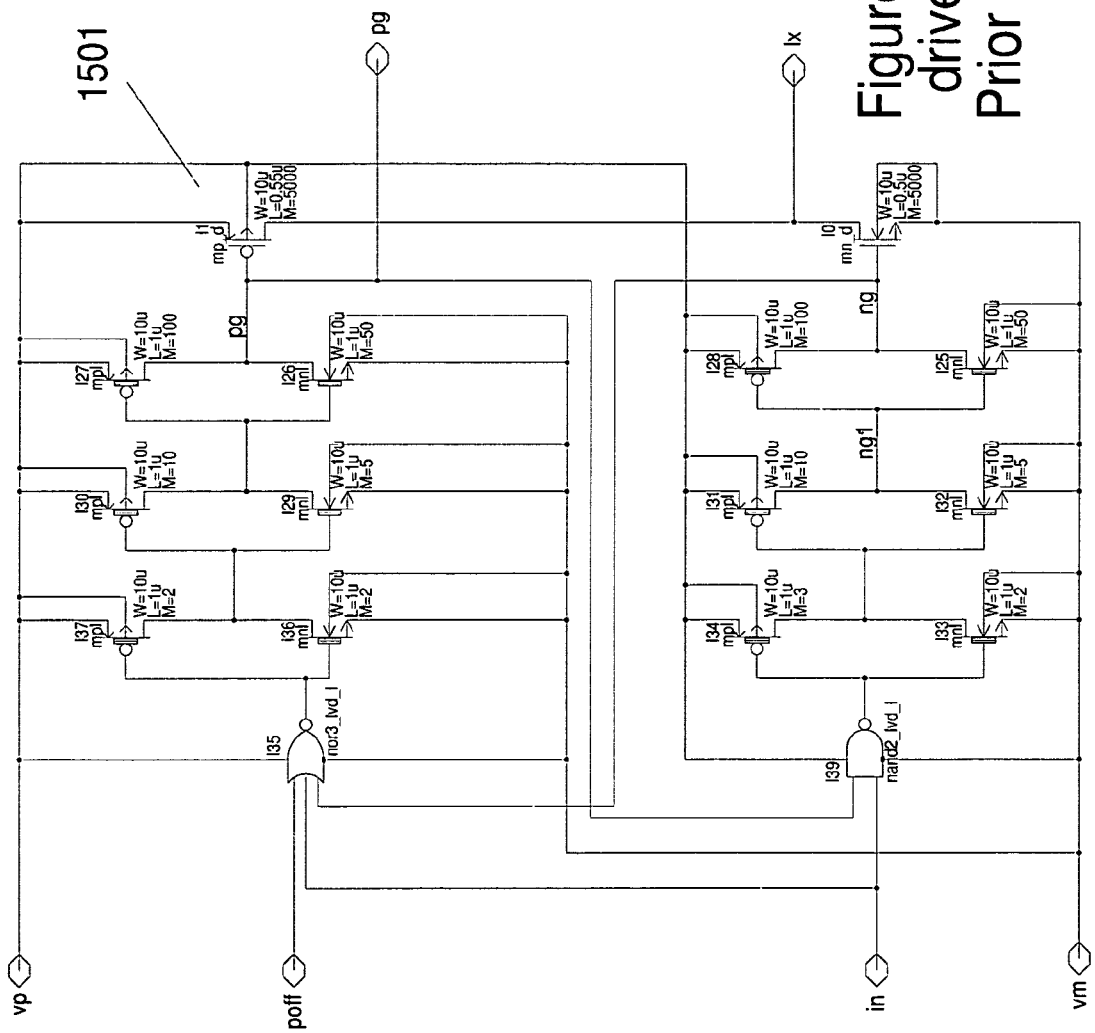
FIG. 15 illustrates an exemplary transistor schematic of the conventional driver sub-cell shown in FIGS. 14a and b.

FIGS. 14a and 14b depict an exemplary transistor implementation of a preferred embodiment of the invention shown as a boost mode converter circuit with the pulse width modulation (PWM) control circuitry not shown for clarity. The PWM control circuitry is well known technology, and those skilled in the art will readily recognize a multiplicity of conventional methods for generating a suitable PWM signal. The different functional sections of the present embodiment are delimited for clarity as corresponding functional areas of the circuit. Drive sub-cell 1403 from FIGS. 14a and b comprises a CMOS half bridge and the associated circuitry to drive that half bridge. The potentially large inductor and output currents are switched through drive sub-cell 1403. FIG. 15 below shows a detail of drive sub-cell 1403.

By way of background information on a standard implementation of a typical switching transistor gate drive scheme, FIG. 15 illustrates a transistor schematic of a conventional implementation of main switch sub-cell 1403 shown in "bbm driver" section of FIGS. 14a and b. Transistors I1 and I0 form the half bridge, and both transistor I1 and transistor I0 are driven by a cascaded string of CMOS transistor inverters of increasing size; i.e., gate drive strength. Gates I35 and I39 provide a "break before make" function, in that a node pg cannot fall before a node ng falls, similarly node ng cannot rise before node pg rises. This function ensures that both transistors I1 and I0 are never simultaneously on thereby avoiding large currents directly from a node vp to a node vm. Since this circuit is part of a boost mode converter, the input of drive sub-cell 1403 is a pin 1x, connected to an external inductor, and the output of drive sub-cell 1403 is a pin vp, connected to an output capacitor (not shown). The "in" signal alternately drives transistors I1 or I0 on and off except when the "poff" signal is high which turns off transistor I1 at the same time that transistor I0 is disengaged. A multiplicity of alternative and suitable switching transistor gate drive techniques will readily be apparent to those skilled in the art.

The embodiment shown in FIG. 14a also comprises a zero cross comparator 1405, which has been represented abstractly in previous FIGS. 11A and 11B. In the current example, a voltage source V48 is added only for simulation purposes in order to simulate the range of offset voltages for which the circuit is capable of correcting. A function of zero cross comparator 1405 is to compare the voltage at nodes 1x and vout. During discontinuous mode operation when the PMOS of the half bridge is on and the voltage at node 1x falls below the voltage at node vout, indicating that the inductor current is reversing direction, the output of a comparator zcross should be driven high. When comparator node zcross makes a transition to a high state, the associated information is latched into a zero cross ff 148 of FIG. 14a. The "q" output of zero cross ff 148 goes high driving the "poff" input of main switch 1403 (see FIG. 14b) high and turning off a large PMOS transistor I1 of the half bridge located inside main switch 1403.

In the present example, zero cross comparator 1405 works by comparing currents through I68 and I69, the functions of which are described in some detail as follows. If the voltage at the source of I69, 1x, is higher than the voltage at the source of I68, vout, then the drain of I69 will drive positive as I69 attempts to source more current than a transistor I71 can sink. Transistor I71 is a current source whose current magnitude should be equal to that of I68. Transistors I43 and I44 provide extra gain. A transistor I42 forces a node zcross to an intermediate voltage during the times that comparator zcross is not in use so that node zcross and the zcl do not have far to slew when a comparison is needed thus increasing the speed of zero cross comparator 1405.

Transistors I57 and I60 are added to adjust the offset of zero cross comparator 1405. The controlling voltage, filt, at the gate of transistor I60 acts to add or subtract extra current into a node zcl. Transistors I70, I71, I57 and I60 can be viewed as an electrically adjustable current mirror where transistor I70 is the reference leg and together the other transistors form a composite mirror leg.

A node "filt" is driven from a current fed integrator 1410 in FIGS. 14a and b labeled as a "current fed integrator" section of the circuit. Current sources I61 and I62 source or sink current into a capacitor I59 as dictated by switches I58 and I63, both of which are driven by a "polarity" signal. If the "polarity" signal is low then switch I63 is on and the voltage at node filt will start to rise. If the "polarity" signal is high then switch I63 will be turned off and switch I58 will be turned on causing the voltage at node filt to fall. As the voltage at node filt increases, the voltage of the source of I69 (node 1x ) required to cause zero cross comparator 1405 to change state increases. As node filt decreases in voltage, the source voltage of I69 (node 1x ) required to flip the state of the comparator decreases. Transistors I50, I34, I55 and a block I47, shown in FIG. 16, are used to produce the very small currents provided by current sources I61 and I62.

Figure 16:
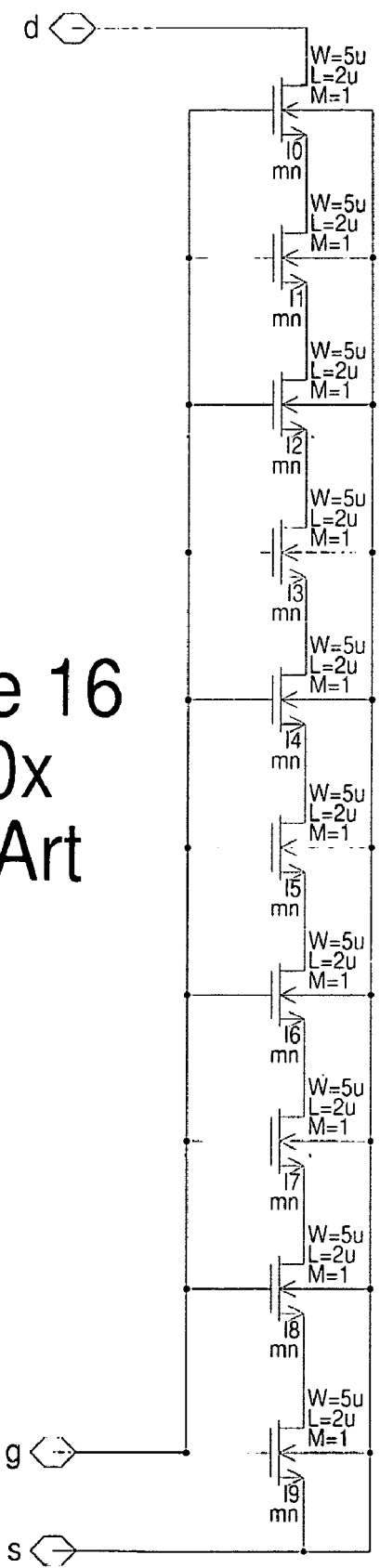
FIG. 16 illustrates an exemplary schematic diagram of a conventional "MN10X" sub-cell shown in FIGS. 14a and b.

FIG. 16 illustrates an exemplary schematic diagram of a prior-art "MN10X" sub-cell shown in FIGS. 14a and b located towards the bottom of the "speedup adaptive bias" section therein. In the present embodiment, block I47 in FIGS. 14a and b is the MN10X sub-cell. The MN10X sub-cell is a series array of ten NMOS transistors. Shown in the Figure are series connected NMOS transistors used as a current source for supplying very small currents to the current fed integrator. This method of producing small bias currents is well known in the art, and there are a multiplicity of conventional alternative methods to produce very small bias currents, including, but not limited to, "delta Vbe" or "delta threshold" bias circuits that may also be suitably implemented.

Referring again to FIGS. 14a and 14b, the "polarity" signal shown is derived from a polarity sense ff I38 located in the "polarity sense ff" section of FIG. 14b. Polarity sense ff I38 senses the voltage at node 1x a short time after the PMOS switch of the half bridge driver in main switch 1403 is disengaged. The gate of large PMOS device I1 in main switch 1403 is node pg, shown in FIGS. 14a, 14b and 15. When "pg" goes high, indicating that the PMOS device of the half bridge is off, it drives a node IN of delay1 sub-cell I41, shown in FIG. 17 and described below. Some number of nanoseconds later the out pin of delay1 sub-cell I41 goes high, which clocks the present stat of node 1x into polarity sense ff I38. The "polarity" signal will stay in its clocked state for at lest the duration of one switching cycle.

Figure 17:
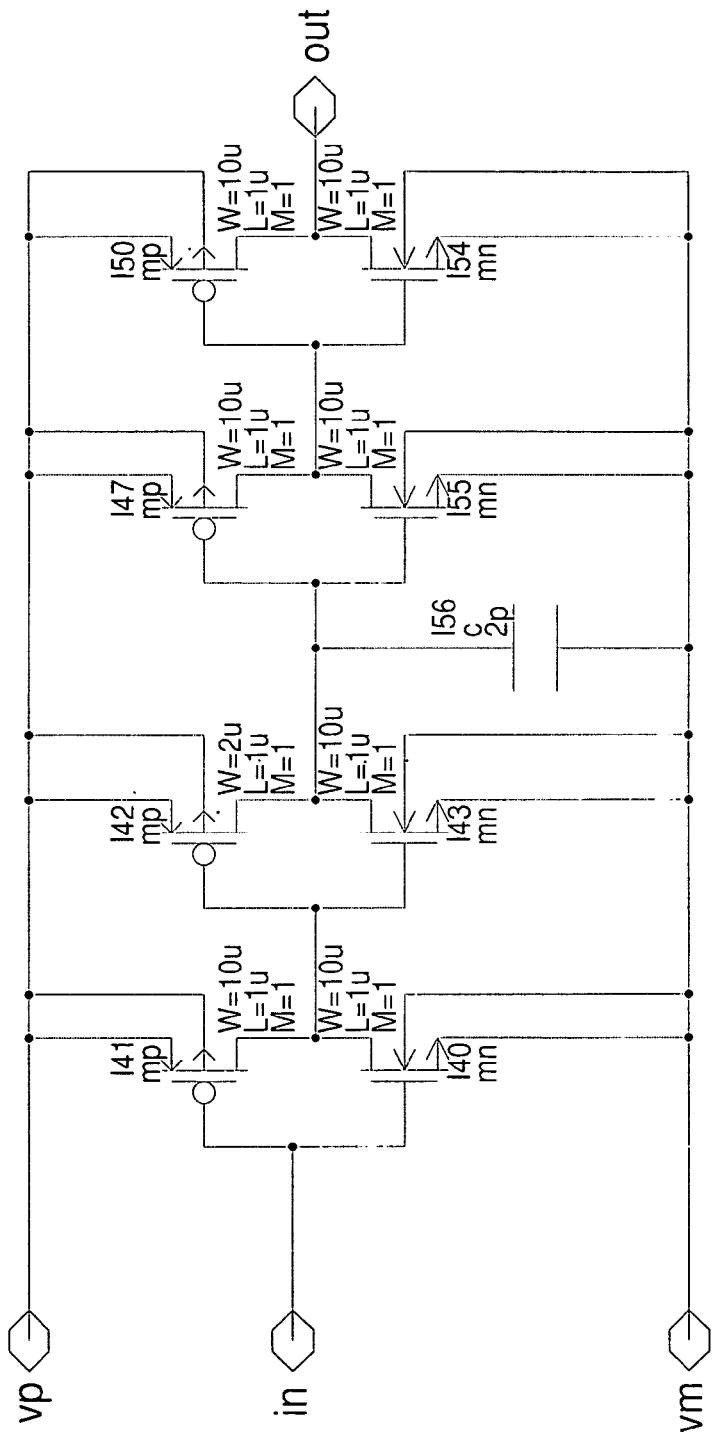
FIG. 17 illustrates an exemplary conventional schematic diagram of the "delay1" sub-cell shown in FIGS. 14a and b.

FIG. 17 illustrates a prior-art schematic diagram of a "delay1" sub-cell shown in FIGS. 14a and b. The design of this block is prior art, other techniques to achieve this function are readily available to those skilled in the art.

Given that in this case the output of the error detector, "polarity", can only be a 1 or 0, the integrator time constant may need to be quite long in order to provide accurate results. Unfortunately, that can require a large number of switching cycles for the circuit to reach regulation. In the present embodiment, two additional, but optional, circuit blocks are added in order to minimize the time required for the circuit to reach the optimal zero cross comparator offset voltage. A toggle sense block 1415 on the right hand side of FIG. 14b detects when the "polarity" signal changes states. For example, without limitation, if the polarity signal stays either low, or high for subsequent clock cycles, the "reset" signal will remain low. If the "polarity" signal toggles from one cycle to the next, the reset signal will go high. When the circuit achieves regulation, the polarity signal will spend much of its time toggling back and forth, which means that a node reset will spend a significant amount of time high. In that case the high reset signal will turn on a NMOS transistor I66, which subsequently turns off NMOS transistor I56. No extra current will flow through a current mirror transistor I50, which means that the charging and discharging current for node filt will remain small and the integrator time constant will remain long.

However, in the case where node filt is not near its regulated value node reset will remain low because the "polarity" signal spends all of its time in one state, for example, without limitation, no toggling, allowing the gate of NMOS transistor I56 to charge up, increasing the current into current mirror transistor I50 by more than ten times and also the charge and discharge current of the current fed integrator. This means that the circuit will race towards regulation at more than ten times the speed it normally would, depending upon the size of NMOS transistor I56. The circuit will overshoot its regulation point, and at that time the state of the "polarity" signal will change causing the charge and discharge currents to return to their normal low values, and therefore causing the time constant of current fed integrator 1410 to slow down to its normal value.

As aspect of the "polarity" signal always being in one of two states is that the signal affects the operation of the controller during times when the PWM control circuitry determines that the half bridge does not need to make any transition. As the load current for the hypothetical boost mode controller decreases from a high value to a lower value, the present circuit will move from continuous mode operation into discontinuous mode operation. As the load current is further reduced, the PWM control loop will force the drive circuitry to turn off during certain clock cycles. For example, without limitation, in a classic fixed frequency PWM controller, every time a clock edge occurs the switching FET will be turned on until a time when the PWM comparator decides that the output is too high, and the controller forces a cycle to be skipped.

In the present embodiment, the "polarity" signal shown in FIGS. 14a and b is left in whatever state it was in previously, discharging or charging node filt as the case may be. In order to keep the voltage of node filt at its current value for as long as the PWM controller skips clock cycles, the bias current to the current fed integrator, and the bias currents for all of the circuitry shown in FIGS. 14a and b, is turned off. This would typically be beneficial to lowering the overall supply current of the PWM controller because there is generally no need to keep the circuitry shown in FIGS. 14a and b biased during time periods when the half bridge is not switching. To accomplish this, an on node 1420 is driven low during times when the half bridge is not required to switch. This will turn PMOS devices I35 and I36 on, turning off all of the bias currents to the circuitry shown in FIGS. 14a and b. This will also turn off an NMOS I37, which disables the speed up current path in order to prevent another means for unwanted currents to flow during times that the half bridge is not required to switch. It should be noted that with PFM (pulse frequency modulation) controllers there is no fixed clock frequency to be skipped; however, the time when both switches of the half bridge should be turned off still becomes arbitrarily large as the load current decreases. The need for fixing the voltage of node filt at its last known voltage generally remains the same as in the fixed frequency controller case.

Figure 18:
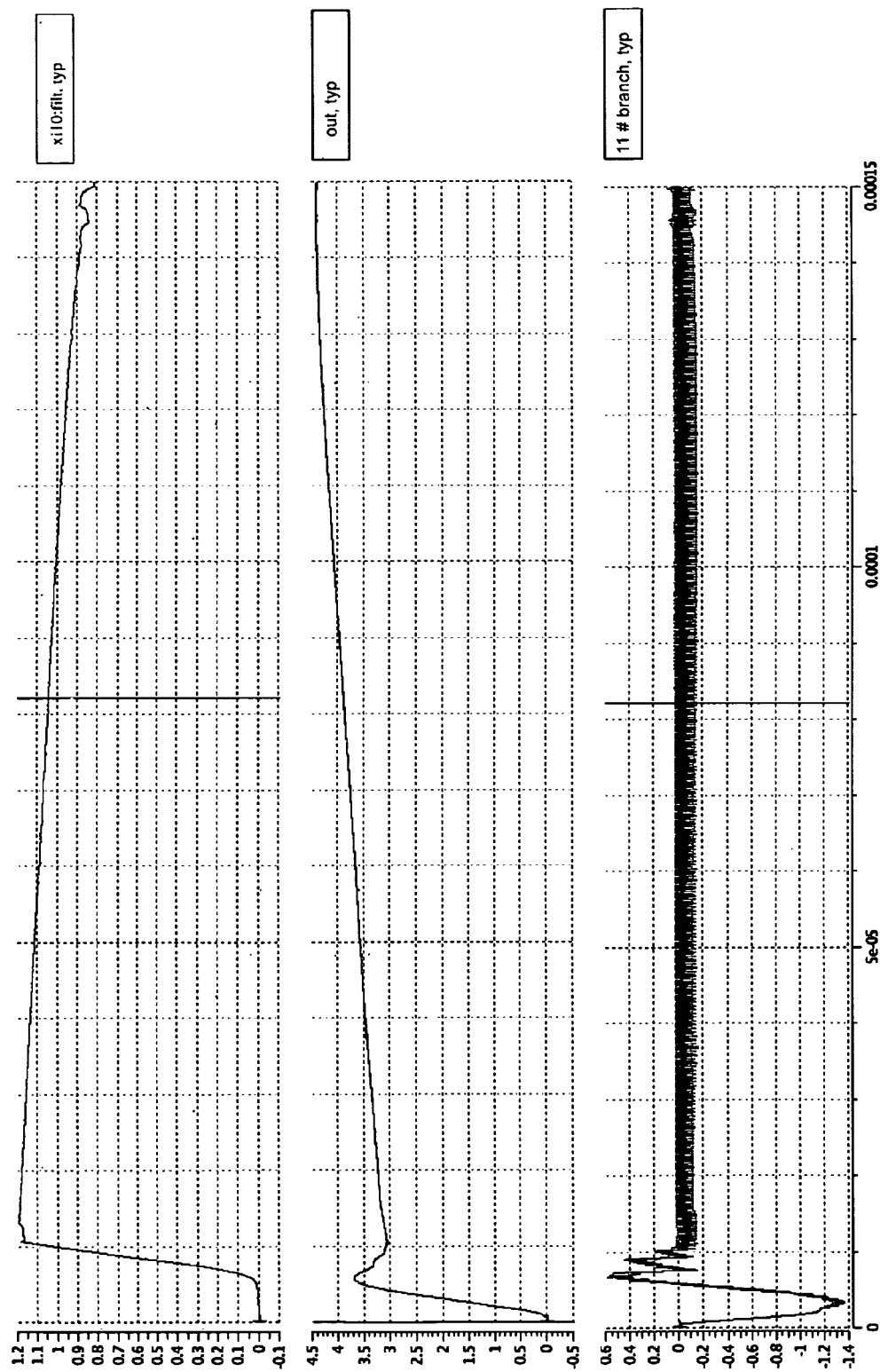
FIG. 18 shows exemplary spice simulation results from the circuit shown in FIGS. 14a and b, in accordance with an embodiment of the present invention.

FIG. 18 shows exemplary spice simulation results from the circuit shown in FIGS. 14a and b. The preferred embodiment was simulated with a spice type simulator available from the open software community using BSIM3v3 transistor models. For ease of simulation and clarity of explanation, the output voltage of the circuit was not regulated. Instead, the PWM signal, shown in FIGS. 14a and b, is a fixed duty cycle pulse, and as such the output voltage rises slowly after its initial quick rise as seen by the middle trace of FIG. 18. For this simulation a time varying offset at the input of zero cross comparator V48, shown in FIGS. 14a and b, was introduced to show the circuit adaptively changing its operating point in order to maintain accurate inductor zero crossing decisions. The offset changes from −50 mV to 50 mV over the course of the simulation. The lower trace shows that the inductor current, after some initial start up behavior, never really exceeds zero regardless of the offset that was introduced into zero cross comparator V48. The top trace shows node filt gradually changing voltage in a linear fashion in order to compensate for the artificially introduced offset voltage.

Figure 19:
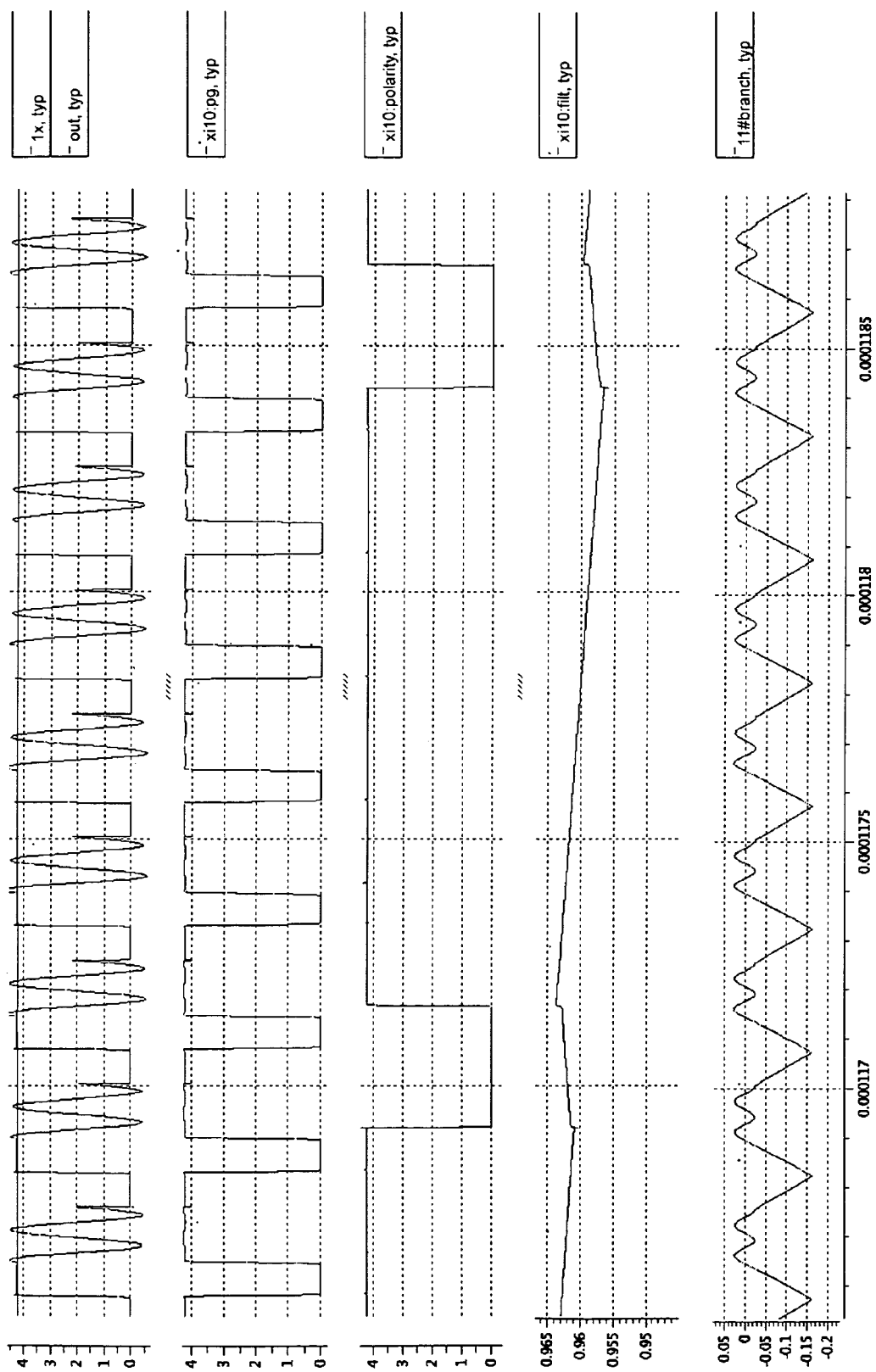
FIG. 19 shows a magnified view of the simulated results shown in FIG. 18.

FIG. 19 illustrates a magnified view of the exemplary simulated results shown in FIG. 18. The inductor current, or bottom trace, rings slightly above zero. The voltage of node filt ramps up and down based on the state of the "polarity" signal although the overall trend of the voltage is downward in order to compensate for the artificially introduced offset voltage.

Figure 20:
FIG. 20 shows exemplary spice simulation results of the circuit shown in FIGS. 14a and b with the adaptive control feature disabled.

FIG. 20 illustrates exemplary spice simulation results of the circuit shown in FIGS. 14a and b with the adaptive control feature disabled. FIG. 20 shows the same circuit with node filt clamped to a 1.05V source. In this simulation there is no adaptive control so the waveforms change as the artificially induced comparator offset changes. Near the beginning of the simulation but after the initial startup response, the inductor current, or bottom trace, is significantly above the zero level indicating that current is flowing in both directions through the inductor.

Figure 21:
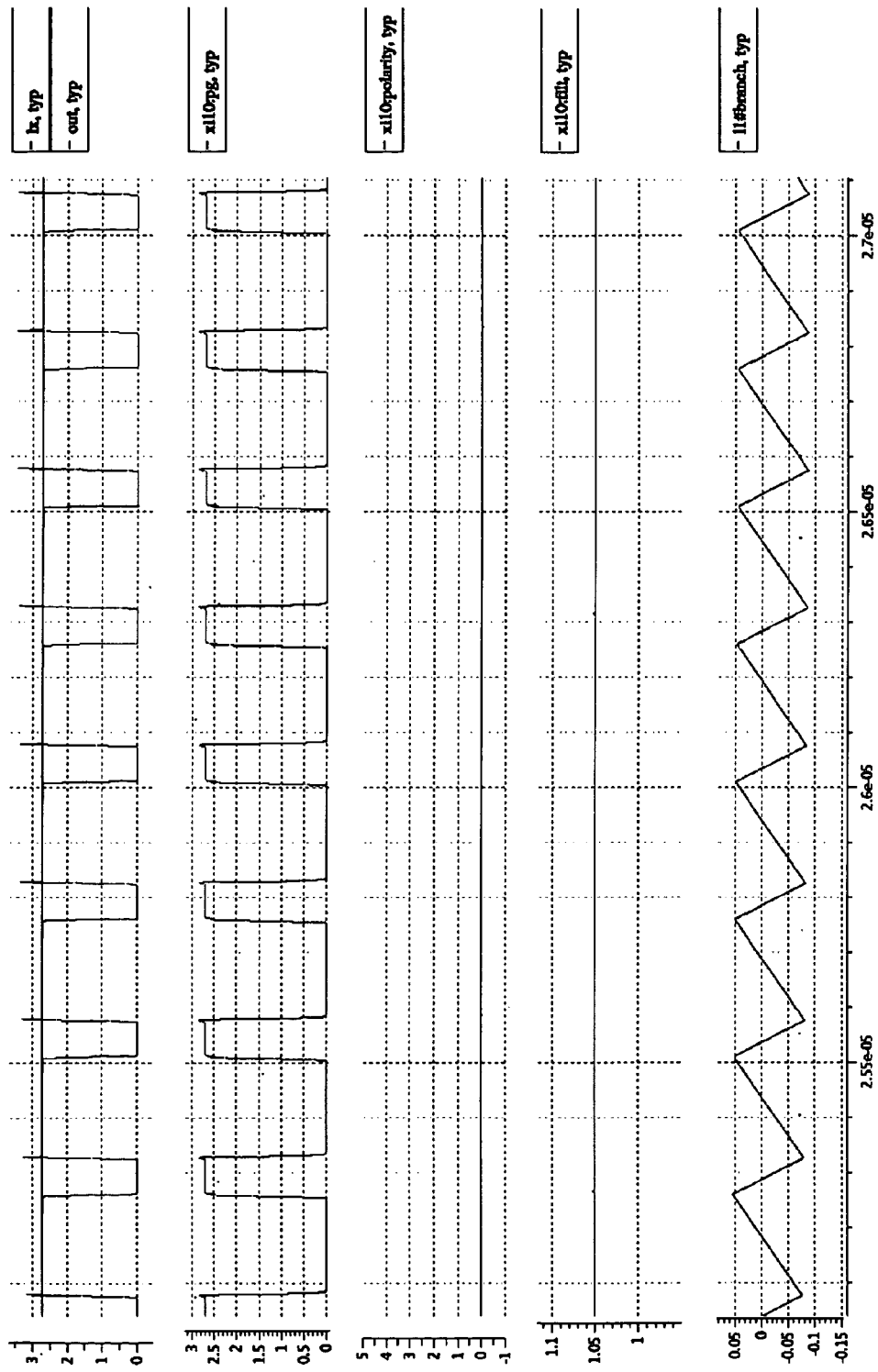
FIG. 21 and FIG. 22 show magnified views of different areas of the simulation results from FIG. 20.
Figure 22:
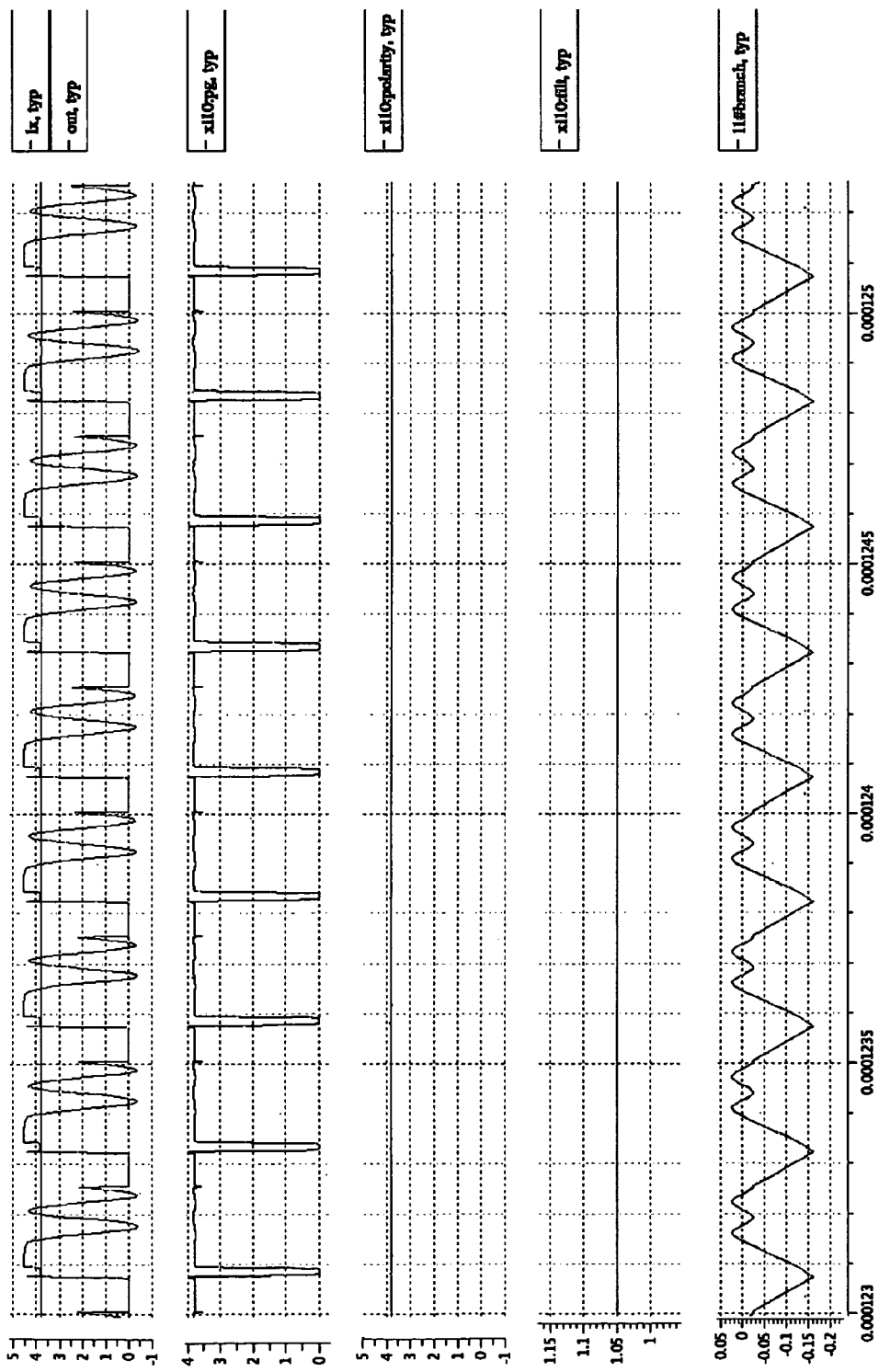

FIG. 21 and FIG. 22 illustrate magnified views of different areas of the simulation results from FIG. 20. FIG. 21 is a close up view of the area near the beginning of the simulation but after the initial start up response that indicates that the current is flowing in both directions. It can be seen that the inductor current is a smooth triangle wave the moves continuously through zero. In this case the offset of zero cross comparator V48 is such that both half-bridge switches are never simultaneously off, except for the small "break before make" as one on switch takes over for another on switch. In the present case, there might as well not be any zero crossing comparator because the synchronous switch (PMOS in this case) never turns off prior to the time that the main switch turns on again.

FIG. 22 is a magnified image of the waveforms from the right side of FIG. 20. At first glance the inductor current waveform, or bottom trace, of FIG. 20 appears to be operating correctly i that the inductor current never travels much above zero. However, a close up view of the area shown in FIG. 22 shows that the PMOS switch of the half bridge is turning off much too soon. The residual current in the inductor is passed by the body diode of the PMOS transistor as can be seen by the voltage at node 1x (top trace) clamping at one diode drop above Vout directly after the PMOS switch turns off. Significant diode current in the switching FET is problematic in that it decreases efficiency, increases the likelihood of SCR latchup in CMOS integrated circuits, and many times can lead to increased ringing because of the larger amount of energy stored in the inductor after the synchronous switch is opened. By applying the techniques described in this disclosure all three of these deleterious effects can be minimized to virtually zero.

Although the previous description of the invention listed only two embodiments the concepts taught and exemplified therein may be applied to a multiplicity of other architectures as will be readily apparent to those skilled in the art. For example, without limitation, the "Error Detection" block shown in FIGS. 11A and 11B can be modified so that the point in time at which the LX voltage is measured is different. The error signal could also be made analog in nature rather than just 0 or 1 as the "polarity" signal, shown in FIGS. 14a and b, is presently defined. For instance, without limitation, the error voltage could be proportional to how close the voltage of node 1x is to some predetermined voltage at some predetermined time. In an analogous manner, the error signal could be related to the amount of time that the voltage of node 1x remains at a certain voltage. For instance, without limitation, the error signal could be an integrated function of the voltage at node 1x over time for some small time interval after the synchronous switch is opened. Finally, the error signal could be related to the filtered ringing response of the voltage of node 1x after the synchronous switch is turned off. In other words, the error signal could be derived from a high pass filtered and recitified version of the voltage of node 1x node after the synchronous switch turns off. In this case, the state of node 1x just after the synchronous switch turn must still be determined as in the other embodiments because it determines the error polarity. The magnitude of the error signal would then be proportional to the filtered, rectified ringing signal from node 1x. Those skilled in the art, in light of the present teaching, will recognize a multiplicity of alternative methods of implementing the concepts described above into various architectures in accordance with embodiments of the present invention.

Those skilled in the art will readily recognize, in accordance with the teachings of the present invention, that any of the foregoing components and/or system modules may be suitably replaced, reordered, removed and additional components and/or system modules may be inserted depending upon the needs of the particular application, and that the systems of the foregoing embodiments may be implemented using any of a wide variety of suitable components and system modules, and is not limited to any particular implementation details that those in the art will readily recognize suitable alternatives for in light of the teachings of the present invention.

Having fully described at least one embodiment of the present invention, other equivalent or alternative synchronous switches for switching regulators according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A method for adaptively compensating for the offset and delay of a comparator in a switching regulator to thereby achieve a more optimal on/off timing of a synchronous switch that is controlled by the comparator in a feedback control loop, the method comprising the Steps of:
    sampling at least one a node in the output of the switching regulator and generating at least one sampled error signal;
    at least in part based on said sampled error signal value, determining if the current comparator offset is too high or too low relative to a target switching regulator output value;
    at least in part based on said offset determination, accordingly generating a compensated feedback error signal that is based at least in part on the sampled error signal; and
    applying said compensated feedback error signal to an input of the comparator to have the effect of a comparator offset adjustment signal, wherein said compensated feedback error signal is operable as a feedback input to the comparator to result in more optimal timing of the on and off times of the synchronous switch to improve convergence towards the target switching regulator output value and thereby lower the next sampled error signal value.

2. The adaptive comparator compensation method of claim 1, in which, generating said compensated feedback error signal is at least in part by way of performing an integration over a plurality of said at least one sampled error signals.

3. The adaptive comparator compensation method of claim 1, in which, generating said compensated feedback error signal is at least in part by way of performing an integration and/or differential and/or gain operation over one or more said at least one sampled error signals.

4. The adaptive comparator compensation method of claim 1, in which, generating said compensated feedback error signal is at least in part based on the degree said sampled error signal deviates from said target output value.

5. The adaptive comparator compensation method of claim 1, in which, generating said compensated feedback error signal is at lest in part based on using a lookup table to retrieve a correction value that corresponds to a characteristic of said sampled error signal.

6. The adaptive comparator compensation method of claim 1, in which the control loop is a negative feedback control loop, and the Step of generating said compensated feedback error signal comprising the Step of generating a signal that has a counteracting effect to said at least one sampled error signal.

7. The adaptive comparator compensation method of claim 1, in which the Step of sampling said at least one node occurs at some time delay after the synchronous switch turns off.

8. The adaptive comparator compensation method of claim 1, in which said comparator offset adjustment signal is operable to adjust the offset of the comparator in two directions.

9. The adaptive comparator compensation method of claim 1, in which said comparator offset adjustment signal is operable to adjust the offset of the comparator in only one direction.

10. The adaptive comparator compensation method of claim 1, in which said comparator offset adjustment signal acts to adjust the offset of the comparator in a direction opposite of what said sample error value would otherwise cause, thereby implementing a Uni-polar offset error correction.

11. The adaptive comparator compensation method of claim 1, further comprising the Step of configuring a comparator as part of a commutating circuit designed to simulate an ideal diode that optionally acts as the synchronous switch.

12. The adaptive comparator compensation method of claim 11, in which at least one of said sampled nodes is the output node of a half-bridge driver in the output of the switching regulator.

13. The adaptive comparator compensation method of claim 12, in which said sampled node has a binary state and said sample node signal value is a voltage, the method further comprises the Steps of:
 if said sampled node voltage is higher than some predetermined threshold value, then forcing the state of said sampled binary state node to one of the binary states for the remainder of the cycle; and
 if said sampled node voltage is lower than some predetermined threshold value, then forcing the state of said sampled binary state node to the opposite state for the remainder of the cycle.

14. The adaptive comparator compensation method of claim 13, in which the Step of generating the compensated feedback error signal is at least in part based upon integrating said high and low states over a certain time period.

15. The adaptive comparator compensation method of claim 14, in which the Step of generating the compensated feedback error signal is further at least in part based upon using said integrated signal to adjust the offset of the comparator such that the time-averaged value of said sampled node voltage is driven toward said predetermined threshold thereby achieving Bipolar correction towards said target output value.

16. The adaptive comparator compensation method of claim 1, in which the Step of generating the compensated feedback error signal is at least in part based upon calculating a linear factor of the difference between a time-integrated value of said sampled node value and a predetermined threshold value.

17. The adaptive comparator compensation method of claim 16, in which the Step of generating the compensated feedback error signal is at least in part based upon using said integrated signal to adjust the offset of the comparator such that the time-averaged value of said sampled node value is driven toward said predetermined threshold.

18. The adaptive comparator compensation method of claim 1, in which the Step of generating the compensated feedback error signal comprises the Step of integrating said compensated feedback error signal over a certain number of cycles and the Step of applying comprises applying said integrated compensated feedback error signal to the input of the comparator and thereby adjust the offset of the comparator such that the time-averaged value of said sampled node value is driven toward said target value.

19. The adaptive comparator compensation method of claim 13, further comprising the Step of using a D type flip flop (DFF) to sample the node voltage and determines a high or low node state, whereby said predetermined threshold value is the input logic threshold of said DFF.

20. A system for adaptively compensating for the offset and delay of a comparator in a switching regulator to thereby achieve a more optimal on/off timing of a synchronous switch that is controlled by the comparator in a feedback control loop, the system comprising:
 means for sampling at lest one a node in the output of the switching regulator and generating at least one sampled error signal;
 means for determining if the current comparator offset is too high or too low relative to a target switching regulator output value, said determination being based at least in part on said sampled error signal value;
 means for generating a compensated feedback error signal that is based at least in part on the sampled error signal, said generation being based at least in part on said offset determination; and
 means for applying said compensated feedback error signal to an input of the comparator to have the effect of a comparator offset adjustment signal, wherein said compensated feedback error signal is operable as a feedback input to the comparator to result in more optimal timing of the on and off times of the synchronous switch to improve convergence towards the target switching regulator output value and thereby lower the next sampled error signal value.

21. The adaptive comparator compensation system of claim 20, further comprising means for a emulating an ideal diode with a commutating comparator circuit, said ideal diode emulation means optionally acting as the synchronous switch.

22. The adaptive comparator compensation system of claim 20, in which said sampled node has a binary state and said sample node signal value is a voltage, the system further comprises:
 means for forcing the state of said sampled binary state node to one of the two binary states for the remainder of the cycle if said sampled node voltage is higher than a predetermined threshold value; and means for forcing the state of said sampled binary state node to the opposite state for the remainder of the cycle if said sampled node voltage is lower than some predetermined threshold value.

23. A system for adaptively compensating for the offset and delay of a comparator in a switching regulator to thereby achieve a more optimal on/off timing of a synchronous switch that is controlled by the comparator in a feedback control loop, the system comprising:
a sampling feedback unit that samples at least one node in the output of the switching regulator and generates at least one sampled error signal;
a feedback analysis unit that determines if the current comparator offset is too high or too low relative to a target switching regulator output value, said feedback analysis unit receiving said sampled error signal value as an input and, based at least in part thereupon, outputs an offset determination signal; and
a feedback compensation unit, which receives said sampled error signal and said offset determination signal as inputs, and, based at least in part thereupon, generates as an output a compensated feedback error signal, said compensated feedback error signal being communicated as a feedback input to the comparator such that said compensated feedback error signal is operable as a comparator offset adjustment signal that results in more optimal comparator control output timing of the on and off times of the synchronous switch and thereby improve convergence towards the target switching regulator output value and lower the next sampled error signal value.

24. The adaptive comparator compensation system of claim 23, in which said feedback compensation unit generates said compensated feedback error signal at least in part by integrating a plurality of said at least one sampled error signals.

25. The adaptive comparator compensation system of claim 23, in which said feedback compensation unit generates said compensated feedback error signal at least in part by performing an integration and/or differential and/or gain operation on one or more of said at least one sampled error signals.

26. The adaptive comparator compensation system of claim 23, in which said feedback compensation unit generates said compensated feedback error signal at least in part based on the degree said sampled error signal deviates from said target output value.

27. The adaptive comparator compensation system of claim 23, in which said feedback compensation unit generates said compensated feedback error signal at least in part by using a lookup table to retrieve a correction value that corresponds to a characteristic of said sampled error signal.

28. The adaptive comparator compensation system of claim 23, in which the control loop is a negative feedback control loop, and said feedback compensation unit generates said compensated feedback error signal such that it has a counteracting effect to said at least one sampled error signal.

29. The adaptive comparator compensation system of claim 23, in which said sampling feedback unit samples said at least one node at some time delay after the synchronous switch turns off.

30. The adaptive comparator compensation system of claim 23, in which said comparator offset adjustment signal is operable to adjust the offset of the comparator in two directions.

31. The adaptive comparator compensation system of claim 23, in which said comparator offset adjustment signal is operable to adjust the offset of the comparator in only one direction.

32. The adaptive comparator compensation system of claim 23, in which said comparator offset adjustment signal acts to adjust the offset of the comparator in a direction opposite of what said sample error value would otherwise cause, thereby implementing a Uni-polar offset error correction.

33. The adaptive comparator compensation system of claim 23, further comprising an ideal diode emulation unit that comprises a comparator configured as part of a commutating circuit designed to emulate an ideal diode, said ideal diode emulation unit being optionally configured to be the synchronous switch.

34. The adaptive comparator compensation system of claim 23, in which at least one of said sampled nodes is the output node of a half-bridge driver in the output of the switching regulator.

35. The adaptive comparator compensation system of claim 34, in which said sampled node has a binary state and said sample node signal value is a voltage, and in which said feedback analysis unit forces the state of said sampled binary state node to one of the two binary states for the remainder of the cycle if said sampled node voltage is higher than some predetermined threshold value, or forces the state of said sampled binary state node to the opposite state for the remainder of the cycle if said sampled node voltage is lower than some predetermined threshold value.

36. The adaptive comparator compensation system of claim 34, in which said feedback compensation unit generates said compensated feedback error signal is at least in part based upon integrating said high and low states over a certain time period.

37. The adaptive comparator compensation system of claim 36, in which said feedback compensation unit generates said compensated feedback error signal additionally at least in part based upon using said integrated signal to adjust the offset of the comparator such that the time-averaged value of said sampled node voltage is driven toward said predetermined threshold thereby achieving Bipolar correction towards said target output value.

38. The adaptive comparator compensation system of claim 23, in which said feedback compensation unit generates said compensated feedback error signal is at least in part based upon calculating a linear factor of the difference between a time-integrated value of said sampled node value and a predetermined threshold value.

39. The adaptive comparator compensation system of claim 23, in which said feedback compensation unit generates said compensated feedback error signal is at least in part based upon using said integrated signal to adjust the offset of the comparator such that the time-averaged value of said sampled node value is driven toward said predetermined threshold.

40. The adaptive comparator compensation system of claim 23, in which said feedback compensation unit generates said compensated feedback error signal by integrating said compensated feedback error signal over a certain number of cycles and communicates said integrated compensated feedback error signal to the input of the comparator to adjust the offset of the comparator such that the time-averaged value of said sampled node value is driven toward said target value.

41. The adaptive comparator compensation system of claim 35, in which said feedback compensation unit is a D type flip flop (DFF) configured to sample the node voltage and determines the high or low node state, whereby said predetermined threshold value is the input logic threshold of said DFF.

42. The adaptive comparator compensation system of claim 41, in which said compensated feedback error signal is the logically negated (QBAR) output of said DFF.

43. The adaptive comparator compensation system of claim 42, in which said compensated feedback error signal output is conditioned by configuring it to drive a current fed integrator such that one state of QBAR results in a net flow of charge on or off a capacitor and the other state of QBAR causes an opposite net flow of charge on or off of said capacitor.

44. The adaptive comparator compensation system of claim 43, in which the voltage on said capacitor is used as a signal conditioned version of said compensated feedback error signal output is conditioned, which is communicated to said feedback input of the comparator so as to be operable as the offset adjustment signal used to adjust to comparator offset voltage.

45. The adaptive comparator compensation system of claim 44, in which said feedback compensation unit is configured to output said signal conditioned compensated feedback error signal so tat it is operable to compensate the offset of the comparator such that said sampled feedback voltage approaches the voltage threshold of the DFF at the particular instance that the node is sampled.

* * * * *